(12) United States Patent
Murata et al.

(10) Patent No.: US 11,653,089 B2
(45) Date of Patent: *May 16, 2023

(54) IMAGING APPARATUS AND CONTROLLING METHOD

(71) Applicant: CANON KABUSHIKI KAISHA, Tokyo (JP)

(72) Inventors: Kenichi Murata, Kawasaki (JP); Shingo Nozawa, Tokyo (JP); Takayuki Sekine, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,580

(22) Filed: Jul. 7, 2022

(65) Prior Publication Data

US 2022/0337750 A1  Oct. 20, 2022

Related U.S. Application Data

(63) Continuation of application No. 16/935,952, filed on Jul. 22, 2020, now Pat. No. 11,412,138.

(30) Foreign Application Priority Data

Aug. 22, 2019  (JP) .............................. JP2019-152245

(51) Int. Cl.
*H04N 5/232* (2006.01)
*H04N 5/76* (2006.01)
*H04N 5/77* (2006.01)
*H04N 9/804* (2006.01)
*H04N 5/217* (2011.01)

(52) U.S. Cl.
CPC ... *H04N 5/23241* (2013.01); *H04N 5/232933* (2018.08); *H04N 5/76* (2013.01)

(58) Field of Classification Search
CPC ........... H04N 5/23241; H04N 5/23245; H04N 5/23293

See application file for complete search history.

(56) References Cited

U.S. PATENT DOCUMENTS

| 11,412,138 | B2 * | 8/2022 | Murata | .................. | H04N 5/772 |
| 2019/0364198 | A1 * | 11/2019 | Wakabayashi | ......... | H04N 5/232 |
| 2020/0221008 | A1 * | 7/2020 | Gandhi | .............. | H04N 5/23241 |

* cited by examiner

*Primary Examiner* — Christopher K Peterson
(74) *Attorney, Agent, or Firm* — Canon U.S.A., Inc. IP Division

(57) ABSTRACT

An imaging apparatus according to embodiments of the present disclosure includes a sensor unit, a front engine that generates compressed raw image data by processing image data acquired from the sensor unit, a main engine that executes a development process on the compressed raw image data acquired from the front engine, and a display unit that displays an image. The front engine controls the display unit to display an image based on the image data acquired from the sensor unit, and the main engine records the image data subjected to the development process in a recording medium.

20 Claims, 14 Drawing Sheets

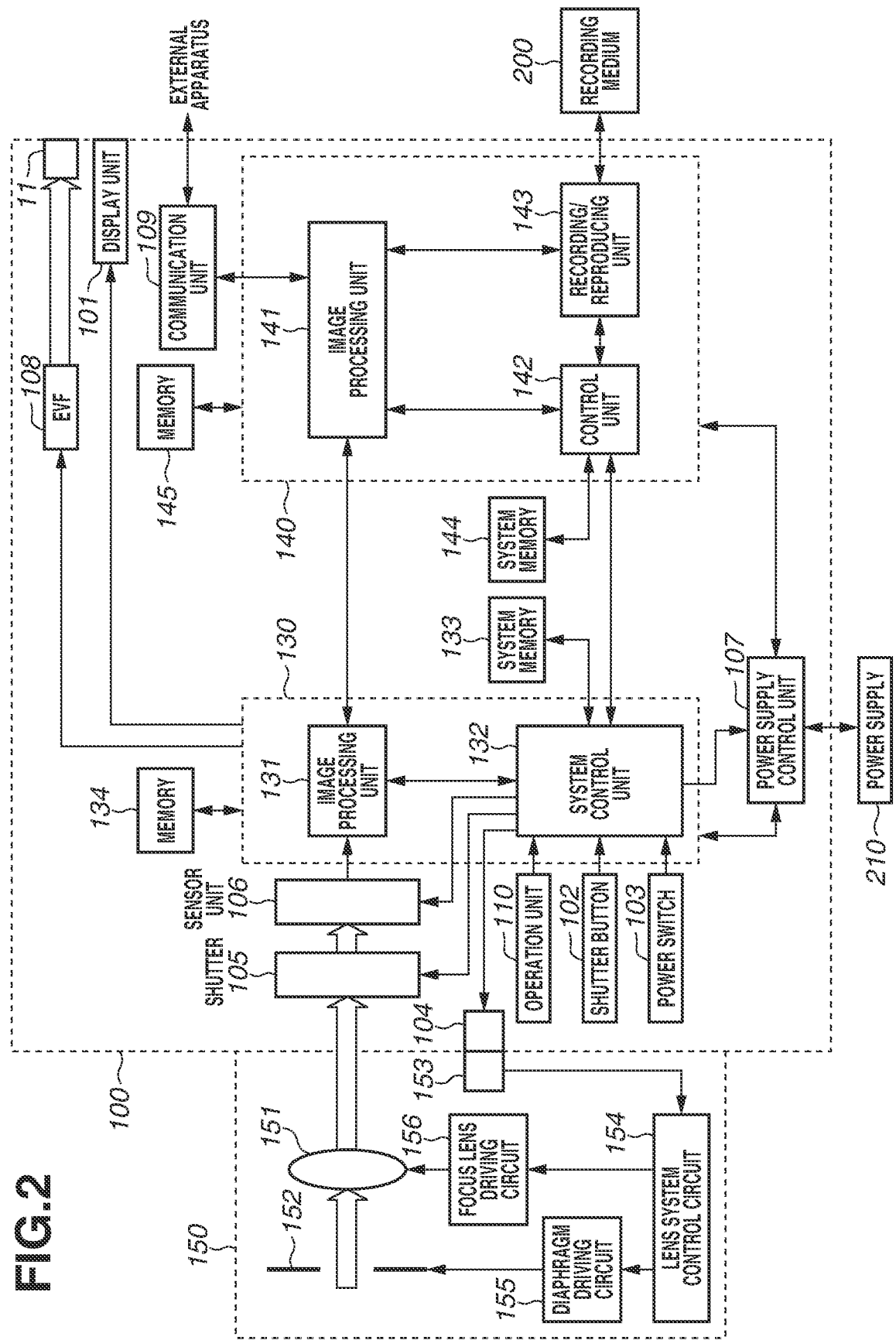

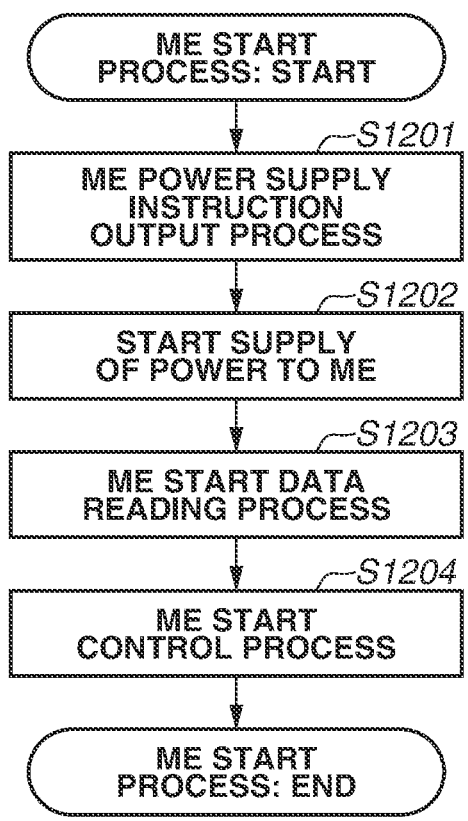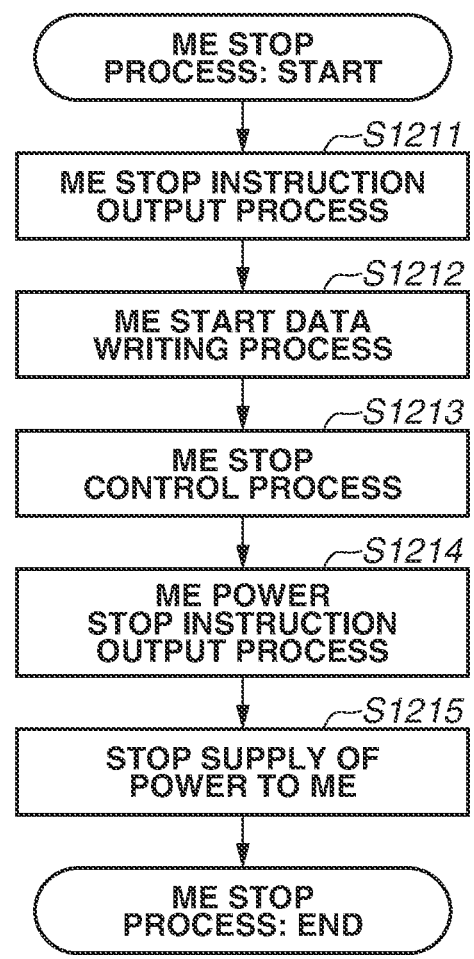

IMAGING APPARATUS AND CONTROLLING METHOD

CROSS-REFERENCE TO RELATED APPLICATIONS

This application is a Continuation of U.S. patent application Ser. No. 16/935,952, filed Jul. 22, 2020, which claims the benefit of Japanese Patent Application No. 2019-152245, filed Aug. 22, 2019, both of which are hereby incorporated by reference herein in their entirety.

BACKGROUND

Field of the Disclosure

The present disclosure relates to an imaging apparatus and an imaging method.

Description of the Related Art

Japanese Patent Application Laid-Open No. 2013-197608 discusses an imaging apparatus that uses a front engine and a back engine to process image data acquired by an imaging circuit.

The imaging apparatus discussed in Japanese Patent Application Laid-Open No. 2013-197608 causes the front engine and the back engine to operate while a live view image is displayed. Thus, even while the live view image is displayed, power to drive the two engines is required.

SUMMARY

According to embodiments of the present disclosure, an imaging apparatus includes an imaging sensor, a display unit configured to display an image, a first processing circuit configured to control the display unit to display an image based on image data acquired from the imaging sensor, a second processing circuit configured to record in a recording medium the image data acquired from the imaging sensor via the first processing circuit, and a control unit configured to control supply of power to the second processing circuit, wherein the control unit restricts the supply of power to the second processing circuit in an image capturing standby state, and, upon input of an instruction regarding an image capturing operation for recording the image data acquired from the imaging sensor in the recording medium, lifts the restriction of the supply of power to the second processing circuit.

Further features of the present disclosure will become apparent from the following description of exemplary embodiments with reference to the attached drawings.

BRIEF DESCRIPTION OF THE DRAWINGS

FIG. 2 is a block diagram illustrating an example of a configuration of the digital camera.

FIGS. 12A and 12B are flowcharts respectively illustrating flows of a start process for starting a main engine and a stop process for stopping the main engine.

DESCRIPTION OF THE EMBODIMENTS

Exemplary embodiments of the present disclosure will be described in detail below with reference to the attached drawings.

Figure 1A:
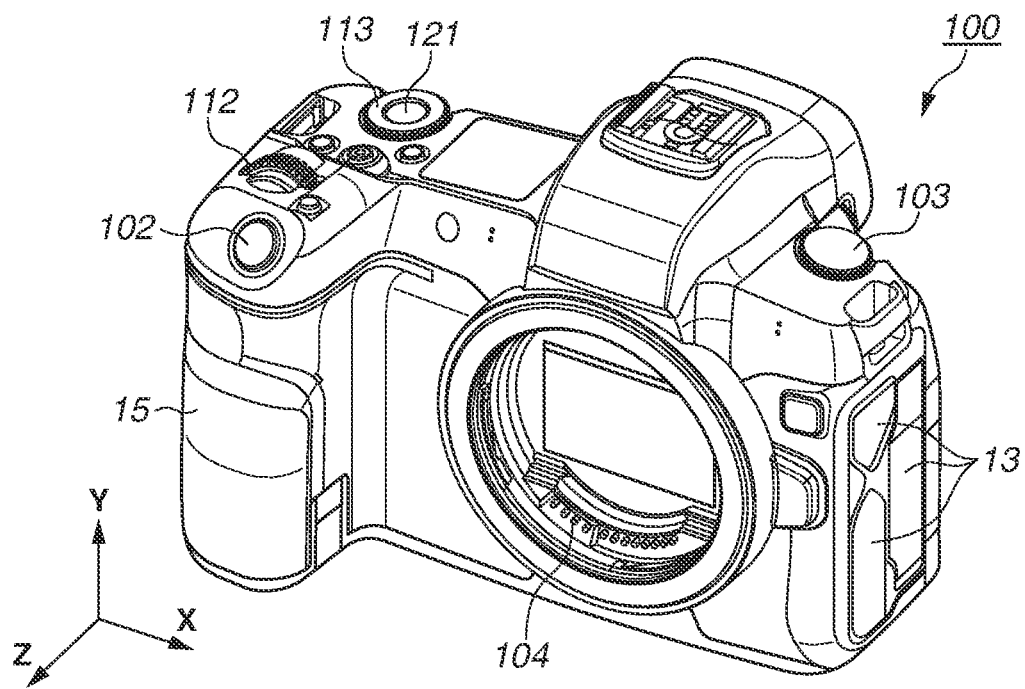
FIGS. 1A and 1B are external views of a digital camera.
Figure 1B:
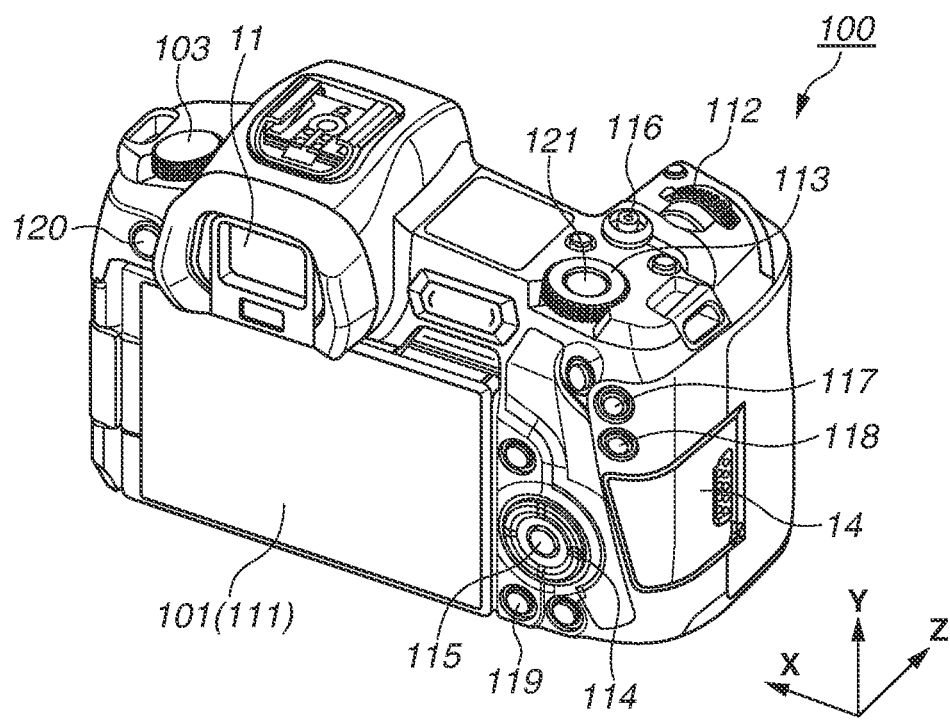

FIGS. 1A and 1B illustrate external views of a digital camera 100 as an example of an apparatus according to an exemplary embodiment to which the present disclosure is applicable. FIG. 1A is a front perspective view of the digital camera 100. FIG. 1B is a rear perspective view of the digital camera 100.

A display unit 101 is a display unit that is provided on the back surface of the digital camera 100 to display an image and various pieces of information. In the display unit 101, a touch panel 111 capable of detecting a touch operation on a display surface (an operation surface) of the display unit 101 is provided. The touch panel 111 is included in an operation unit 110.

A shutter button 102 is an operation member for giving an image capturing instruction.

A power switch 103 is an operation member for switching turning on and off of the digital camera 100. The power switch 103 inputs a start instruction to turn on the digital camera 100. The power switch 103 also inputs a stop instruction to turn off the digital camera 100.

The operation unit 110 represents some or all of operation members included in the digital camera 100. The operation unit 110 includes the touch panel 111, a main electronic dial 112, a sub electronic dial 113, a cross key 114, and a SET button 115. The operation unit 110 also includes a moving image button 116, an automatic exposure (AE) lock button 117, an enlargement button 118, a reproduction button 119, a menu button 120, and a mode switch 121. The operation unit 110 may include the shutter button 102 and the power switch 103. The functions of the operation members included in the operation unit 110 may be assigned to buttons physically different from each other, or a plurality of functions can also be executed using a single button. In the present exemplary embodiment, for illustrative purposes, the shutter button 102 and the power switch 103 are treated as operation members separate from the operation unit 110.

The main electronic dial 112 is a rotary operation member included in the operation unit 110. By rotating the main electronic dial 112, it is possible to change the setting value of the shutter speed or the diaphragm. The sub electronic dial 113 is a rotary operation member included in the operation unit 110 and enables the movement of a selection frame or image advancement. The cross key 114 is a cross key (four-direction key) included in the operation unit 110. Upper, lower, left, and right portions of the cross key 114 can be pushed. The cross key 114 enables an operation corresponding to a pushed portion of the cross key 114. The SET button 115 is a push button included in the operation unit 110 and is mainly used to determine a selection item. The moving image button 116 is used to give an instruction to start or stop the capturing (recording) of a moving image. The AE lock button 117 is included in the operation unit 110. By pressing the AE lock button 117 in an image capturing standby state, it is possible to fix an exposure state. The enlargement button 118 is an operation button included in the operation unit 110 and used to turn on and off an enlargement mode in live view (LV) display in an image capturing mode. By turning on the enlargement mode and then operating the main electronic dial 112, it is possible to enlarge and reduce an LV image. In a reproduction mode, the enlargement button 118 functions as an enlargement button for enlarging a reproduction image and increasing the enlargement ratio. The reproduction button 119 is an operation button included in the operation unit 110 and used to switch the image capturing mode and the reproduction mode. The reproduction button 119 is pressed in the image capturing mode, whereby the image capturing mode transitions to the reproduction mode, and the latest image among images recorded in a recording medium 200 can be displayed on the display unit 101. The menu button 120 is included in the operation unit 110. If the menu button 120 is pressed, a menu screen where various settings can be made is displayed on the display unit 101. A user can intuitively make various settings using the menu screen displayed on the display unit 101, the cross key 114, and the SET button 115. The mode switch 121 is an operation member for switching various modes.

A communication terminal 104 is a communication terminal for the digital camera 100 communicating with a lens attachable to and detachable from the digital camera 100 or with an adapter to which the lens is connected. An eyepiece portion 11 is an eyepiece portion of an eyepiece viewfinder (look-in type viewfinder). The user can visually confirm a video displayed on an electronic viewfinder (EVF) 108 within the eyepiece viewfinder through the eyepiece portion 11. An eye approach detection unit 12 is an eye approach detection sensor that detects whether the eye of a user approaches the eyepiece portion 11.

A terminal cover 13 is a cover for protecting a terminal (not illustrated) for connecting the digital camera 100 to an external device.

A cover 14 is a cover of a slot in which the recording medium 200 is stored. A grip portion 15 is a holding portion shaped so as to be easily gripped with the right hand when the user holds the digital camera 100. The shutter button 102 and the main electronic dial 112 are placed at the positions where the shutter button 102 and the main electronic dial 112 can be operated with the right index finger in the state where the digital camera 100 is held by gripping the grip portion 15 with the right little, third, and middle fingers. The sub electronic dial 113 is placed at the position where the sub electronic dial 113 can be operated with the right thumb in the same state.

FIG. 2 is a block diagram illustrating an example of configuration of the digital camera 100 according to the present exemplary embodiment. In FIG. 2, a lens unit 150 is a lens unit including an interchangeable imaging lens. Although a lens 151 normally includes a plurality of lenses, FIG. 2 illustrates only a single lens in a simplified manner A communication terminal 153 is a communication terminal for the lens unit 150 to communicate with the digital camera 100. The communication terminal 104 is a communication terminal for the digital camera 100 to communicate with the lens unit 150. The lens unit 150 communicates with a system control unit 132 via the communication terminals 153 and 104 and causes a lens system control circuit 154 within the lens unit 150 to control a diaphragm 152 via a diaphragm driving circuit 155. The lens unit 150 communicates with the system control unit 132 via the communication terminals 153 and 104 and causes the lens system control circuit 154 within the lens unit 150 to displace the position of the lens 151 via a focus lens driving circuit 156, thereby bringing the lens 151 into focus.

A shutter 105 is a focal-plane shutter capable of freely controlling the exposure time of a sensor unit 106 by control of the system control unit 132.

The sensor unit 106 includes an image sensor configured of a charge-coupled device (CCD) sensor or a complementary metal-oxide-semiconductor (CMOS) semiconductor sensor that converts an optical image into an electric signal, and an analog-to-digital (A/D) converter that converts an analog signal output from the image sensor into a digital signal and outputs image data. The sensor unit 106 may include an imaging plane phase difference sensor that outputs amount-of-defocus information to the system control unit 132.

A front engine 130 is configured as a single semiconductor integrated circuit chip (IC chip). The front engine 130 includes one or more processors or circuits. The front engine 130 includes an image processing unit 131 that processes image data acquired from the sensor unit 106, and the system control unit 132 that controls the entire digital camera 100. The front engine 130 executes a display control process for controlling the display unit 101 and the EVF 108 to display a live view image on at least one of the display unit 101 and the EVF 108 using the image data acquired from the sensor unit 106. "Live view" (live view function) refers to a function for the user to confirm a target (object) to be captured, the angle of view, and imaging conditions using an image displayed on the display unit 101 and the EVF 108. A "live view image" refers to an image displayed on a display device in the live view function.

If the live view function is enabled, the sensor unit 106 continuously acquires image data. Based on the image data input from the sensor unit 106, the front engine 130 generates display image data to be displayed on the display unit 101 and the EVF 108. Further, the front engine 130 controls at least one of the display unit 101 and the EVF 108 to display an image based on the generated display image data. If the digital camera 100 is connected to an external display device (external apparatus) via a communication unit 109, and the output function to the external apparatus is enabled, the live view function may be executed using the external apparatus (live view output process). In this case, a main engine 140 acquires image data from the front engine 130, generates display image data, and controls the display unit 101 and the EVF 108.

According to the operation mode of the digital camera 100, the front engine 130 controls the start of the main engine 140. The front engine 130 is a semiconductor integrated circuit at least different from the main engine 140. The front engine 130 will be described in detail below.

A system memory 133 is a non-volatile storage medium that stores programs and parameters for the system control unit 132 of the front engine 130 to control the operation of the entirety of the digital camera 100. The "programs" as used herein refer to programs for executing various flowcharts in the present exemplary embodiment. As the system memory 133, for example, a flash memory is used.

A memory 134 is a storage medium in which the image processing unit 131 stores the image data to be processed and the processed image data, when image data is processed. For example, the memory 134 is a dynamic random-access memory (DRAM). Alternatively, parts of the image data to be processed and the processed image data can also be stored in a part of the system memory 133.

The main engine 140 is configured as a single semiconductor integrated circuit chip (IC chip) different from the front engine 130. The main engine 140 includes one or more processors or circuits. The main engine 140 includes an image processing unit 141 that processes image data acquired from the front engine 130, and a control unit 142 that controls the functional units of the main engine 140. The main engine 140 also includes a recording/reproducing unit 143 that stores in the recording medium 200 the image data processed by the image processing unit 141. The recording/reproducing unit 143 also reads image data from the recording medium 200 and outputs the read image data to the image processing unit 141. If the digital camera 100 operates in the reproduction mode, the image data processed by the image processing unit 141 is output to the front engine 130, and an image is displayed on the display unit 101. If an external output function is enabled, the image data read by the recording/reproducing unit 143 and processed by the image processing unit 141 is output to the external apparatus of the digital camera 100 via the communication unit 109. The main engine 140 will be described in detail below.

A system memory 144 is a non-volatile storage medium that stores programs and parameters for the control unit 142 of the main engine 140 to control the functional units of the main engine 140. As the system memory 144, for example, a flash memory is used.

A memory 145 is a storage medium in which the image processing unit 141 stores the image data to be processed and the processed image data, when image data is processed. For example, the memory 145 is a magneto-resistive random access memory (MRAM).

A power supply control unit 107 includes a battery detection circuit, a direct-current-to-direct-current (DC/DC) converter, and a switch circuit for switching blocks to which current is supplied. The power supply control unit 107 detects the presence or absence of attachment of a power supply 210, the type of the power supply 210, and the remaining amount of power of the power supply 210 (remaining life of battery). The power supply control unit 107 controls the DC/DC converter based on the detection results and an instruction from the system control unit 132 to supply required power to the components including the front engine 130 and the main engine 140 for a required period. The power supply control unit 107 also supplies power to the recording medium 200 and the lens unit 150. Based on image data acquired by the sensor unit 106, the power supply control unit 107 displays a live view image on the display unit 101 or the EVF 108, and in the image capturing standby state, where image data is not recorded in the recording medium 200, the power supply control unit 107 limits power supplied to the main engine 140.

The power supply 210 includes a primary battery such as an alkaline battery or a lithium battery, a secondary battery such as a nickel-cadmium (NiCd) battery, a nickel-metal hydrate (NiMH) battery, or a lithium-ion (Li) battery, or an alternating current (AC) adapter. The power supply 210 is attachable to and detachable from the digital camera 100.

The EVF 108 displays an image generated by the front engine 130 on a display device such as a liquid crystal display (LCD) or an organic electroluminescent (EL) display. The user can confirm an optical image displayed on the EVF 108 through the eyepiece portion 11.

The communication unit 109 connects to the external apparatus wirelessly or via a cable for a wired connection, and transmits and receives a video signal and a sound signal to and from the external apparatus. For example, the communication unit 109 converts a signal into a format compliant with the High-Definition Multimedia Interface (HDMI®) standard and outputs the signal to the external apparatus. The communication unit 109 can also connect to a wireless local area network (LAN) or the Internet. The communication unit 109 can also communicate with the external device also using Bluetooth® or Bluetooth® Low Energy. The communication unit 109 can transmit an image (including a live view image) captured by the digital camera 100 or an image stored in the recording medium 200. The communication unit 109 can also receive an image or various other pieces of information from the external device.

The operation unit 110 is an operation unit including one or more operation members for inputting various operation instructions to the system control unit 132. For example, the mode switch 121 is used to switch the operation mode of the system control unit 132 to any one of a still image capturing mode, a moving image capturing mode, and the reproduction mode. The still image capturing mode includes an auto image capturing mode, an auto scene distinction mode, a manual mode, a stop priority mode (Av mode), a shutter speed priority mode (Tv mode), and a program AE mode (P mode). The still image capturing mode includes various scene modes in which image capturing settings are made according to image capturing scenes, and a custom mode. Using the mode switch 121, the user can directly switch to any one of these modes. Alternatively, using the mode switch 121, the user may once switch to a list screen of image capturing modes, then select any one of a plurality of modes displayed on the list screen, and switch to the selected mode using another operation member. Similarly, the moving image capturing mode may also include a plurality of modes. Each image capturing mode includes a state where a live view process for displaying a live view image for image capturing preparation such as the confirmation of the state of an object to be captured and the angle of view is executed, and a state where an image capturing/recording process for capturing an object and recording obtained image data in the recording medium 200 is executed.

A first shutter switch 102a is turned on in an intermediate state of an operation, i.e., by a so-called half press (image capturing preparation instruction), on the shutter button 102 provided in the digital camera 100 and generates a first shutter switch signal SW1. In response to the reception of the first shutter switch signal SW1, the system control unit 132 executes an image capturing preparation operation such as an AF process, an AE process, an automatic white balance (AWB) process, or a pre-flash (EF) process. In other words, the first shutter switch signal SW1 is an image capturing preparation instruction.

A second shutter switch 102b is turned on by the completion of an operation, i.e., by a so-called full press (image capturing instruction), on the shutter button 102 and generates a second shutter switch signal SW2. Based on the second shutter switch signal SW2, the system control unit 132 starts a series of operations of an image capturing process from the reading of a signal from the sensor unit 106 to the writing of a captured image as an image file to the recording medium 200.

In response to the reception of the second shutter switch signal SW2, the system control unit 132 controls the sensor unit 106 to generate image data. Further, in response to the reception of the second shutter switch signal SW2, the system control unit 132 controls the power supply control unit 107 to cancel the limitation of power supplied to the main engine 140, and starts the main engine 140. Then, the main engine 140 records, in the recording medium 200, the image data generated by the sensor unit 106 and acquired via the front engine 130. In other words, the second shutter switch signal SW2 is an image capturing instruction.

The recording medium 200 is a recording medium such as a memory card for recording a captured image and is composed of a semiconductor memory or a magnetic disk.

Image processing of the front engine 130 and the main engine 140 is described.

Figure 3:
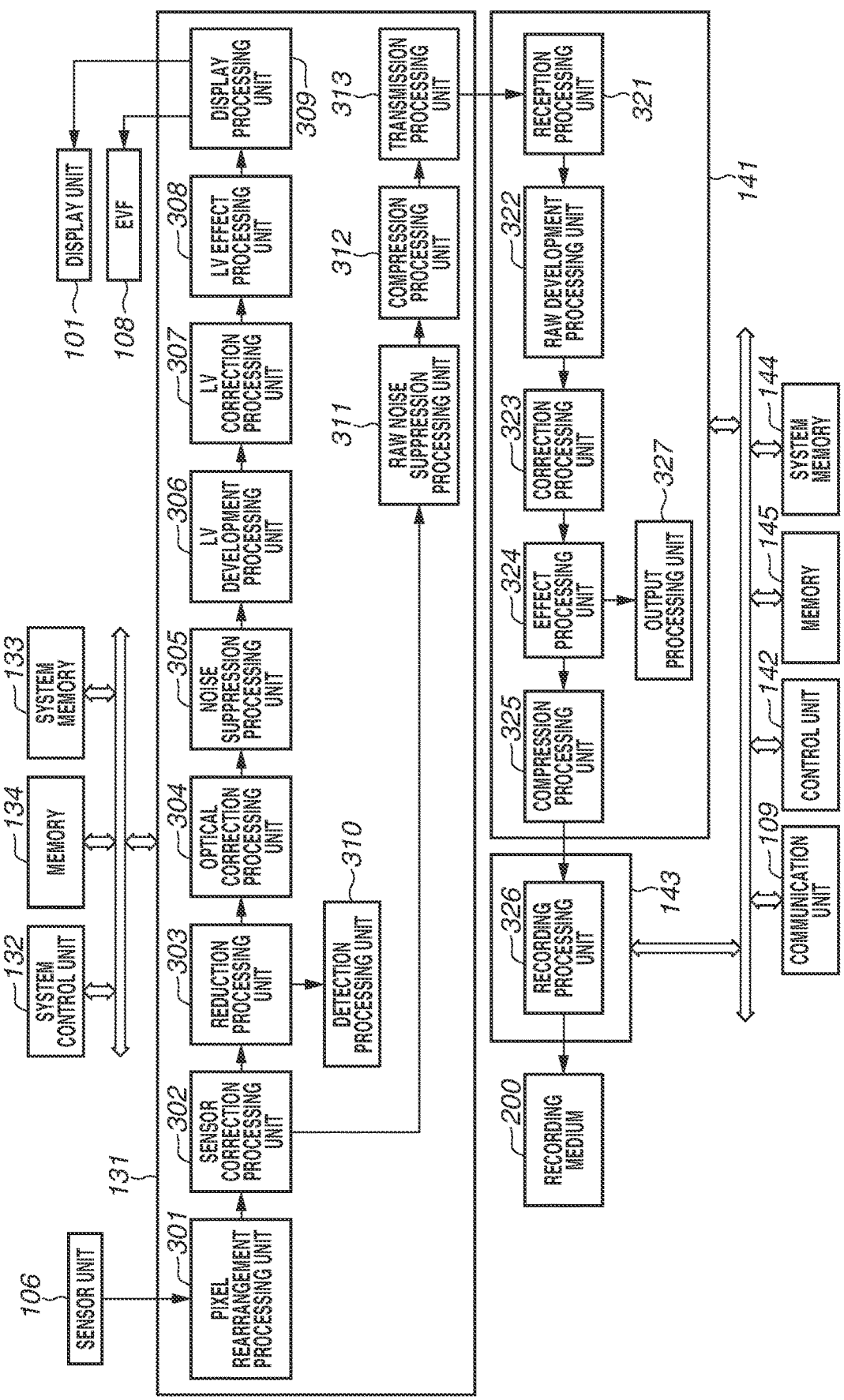
FIG. 3 is a block diagram illustrating a data flow in an image capturing mode.

FIG. 3 is a schematic diagram illustrating functional blocks of the image processing unit 131 and the system control unit 132 of the front engine 130 and a data flow in the image capturing mode. The image processing unit 131, the image processing unit 141, and the recording/reproducing unit 143 each include processing units for processing image data. Processing executed by each processing unit may be executed by an electronic circuit, or may be executed by a processor included in the image processing unit executing a program.

If the second shutter switch signal SW2 is input from the shutter button 102, the system control unit 132 starts an image capturing/recording process. The system control unit 132 controls the shutter 105 and the sensor unit 106 to input an optical image of an object as an image capturing target through the lens 151 and form the optical image on the sensor unit 106. The operations of the lens 151 and the sensor unit 106 when an image is captured are executed based on parameters acquired in advance by an image capturing preparation operation executed in response to the input of the first shutter switch signal SW1. If the parameters are not acquired because the period from the input of the first shutter switch signal SW1 to the input of the second shutter switch signal SW2 is short, the parameters stored in advance in the memory 134 are used. The parameters are determined by the system control unit 132 based on the results of calculating the evaluation values of the aperture, focus, and camera shake, and object information such as a face recognition result.

Figure 13:
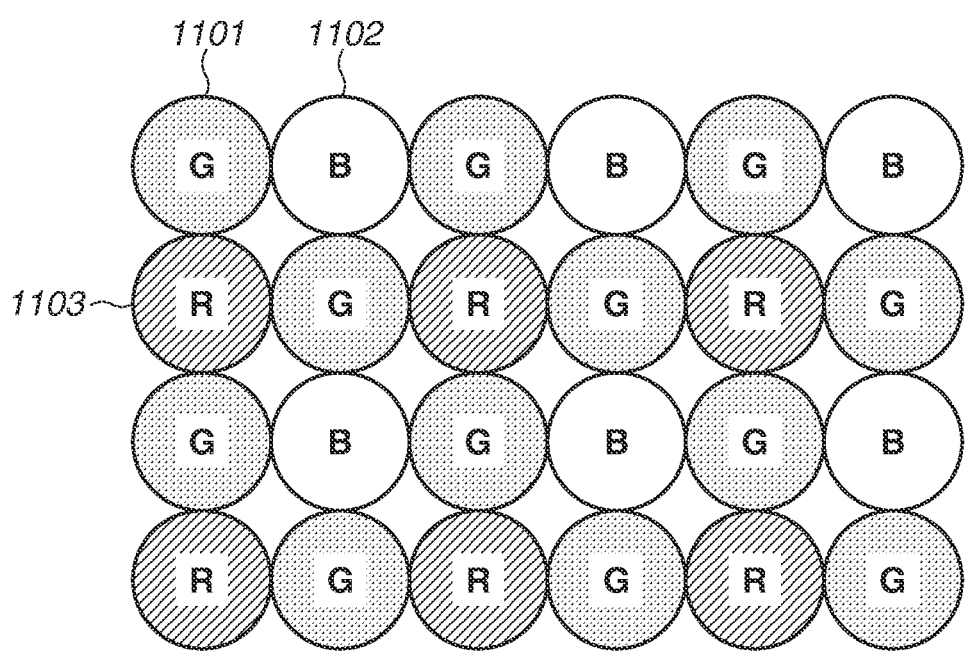
FIG. 13 is a diagram illustrating an example of color filter arranged in a sensor unit.

The sensor unit 106 converts light transmitted through a mosaic color filter of red, green, and blue (RGB) arranged on a pixel-by-pixel basis into electric signals. The number of pixels of an imaging sensor is 4K (8 megapixels or more) or 8K (33 megapixels or more), for example. The imaging sensor corresponding to 4K includes, for example, 3840 horizontal×2160 vertical pixels arranged in a matrix. The imaging sensor corresponding to 8K includes, for example, 7680 horizontal×4320 vertical pixels arranged in a matrix. FIG. 13 is a diagram illustrating an example of the color filter arranged in the sensor unit 106 and represents the pixel arrangement of an image treated by the digital camera 100. As illustrated in FIG. 13, in this structure, red (R), green (G), and blue (B) are arranged on a pixel-by-pixel basis in a mosaic. Then, in every 2×2 (four) pixels, a single red pixel, a single blue pixel, and two green pixels are regularly arranged as a single set. The electric signals converted by the sensor unit 106 include red (R), green (G), and blue (B) components. Green (G) can also be treated as two types of green (G0 and G1) components different depending on positions. Such arrangement of pixels is generally termed the "Bayer arrangement". The sensor unit 106 can output a frame (image data) composed of 4K or 8K pixels at 120 frames per second.

The electric signals converted by the sensor unit 106 are input to the image processing unit 131 of the front engine 130.

The image processing unit 131 is an image processing circuit including one or more processors and circuits that process input image data. As illustrated in FIG. 3, the image processing unit 131 includes a plurality of functional blocks (processes). Each functional block (process) may be implemented by an individual program or electronic circuit, or the plurality of functional blocks may be implemented by a single program or electronic circuit. In the transmission and reception of data between the functional blocks of the image processing unit 131, the data may be directly transmitted between the functional blocks, or a preprocessing functional block may store the data in the memory 134, and a post-processing functional block may read the data from the memory 134.

The image processing unit 131 includes an image processing path used to display a live view image or acquire imaging parameters, and an image processing path used for the image capturing/recording process. First, a description is given of the processing of the image processing unit 131 in the image processing path used to display a live view image or acquire imaging parameters.

A pixel rearrangement processing unit 301 rearranges the input electric signals in a two-dimensional matrix, thereby generating raw image data. In the present exemplary embodiment, the raw image data includes so-called Bayer raw image data output from the sensor unit 106 and having monochromatic color information with respect to each pixel corresponding to the pixel arrangement of the sensor unit 106. In the present exemplary embodiment, the raw image data includes image data obtained by applying compression or correction on partial data to the Bayer raw image data output from the sensor unit 106. In other words, image data obtained without applying a so-called "development process" to the Bayer raw image data output from the sensor unit 106 is referred to as the "raw image data".

A sensor correction processing unit 302 executes on the raw image data a correction process (sensor correction process) based on the characteristics of the sensor acquired in advance. The sensor correction process is, for example, the process of correcting the in-plane variation of the photoelectric conversion efficiency (sensitivity) of a photoelectric conversion element of the sensor unit 106. The raw image data is corrected based on the sensitivity distribution of the sensor unit 106 stored in advance in the system memory 133. The correction process by the sensor correction processing unit 302 also includes a restoration process for restoring a pixel. The restoration process includes the following process. For the value of a missing pixel or a pixel having low reliability in the sensor unit 106, the pixel as a restoration target is interpolated using surrounding pixel values, or a predetermined offset value is subtracted from the value of the pixel as the restoration target. The restoration process may be changed so as not to perform a part or all of the restoration process at this time, and is performed at the time of development at the subsequent stage.

During the execution of the LV display process, the raw image data subjected to the sensor correction process is processed by a reduction processing unit 303. During the execution of the image capturing/recording process, the raw image data subjected to the sensor correction process is processed by a raw noise suppression processing unit 311.

The reduction processing unit 303 reduces the resolution of the raw image data to efficiently perform a display process and a detection process. The reduction processing unit 303 resizes the raw image data having high resolution such as 4K or 8K to a high-definition (HD) size (equivalent to 2 megapixels), for example. The HD size is a size where 1920 horizontal×1080 vertical pixels are arranged, for example. Hereinafter, a raw image reduced by the reduction processing unit 303 will be referred to as "reduced raw image data".

The reduced raw image data processed by the reduction processing unit 303 is processed by an optical correction processing unit 304 and used to display an LV image. The reduced raw image data processed by the reduction processing unit 303 is also processed by a detection processing unit 310 and used to acquire the results of calculating the evaluation values of the aperture, focus, and camera shake, and object information such as a face recognition result.

The processes performed by the optical correction processing unit 304 to a display processing unit 309 are described. The series of processes is processing for displaying an LV image.

The optical correction processing unit 304 executes a correction process (optical correction process) related to the optical characteristics of the lens 151 on the reduced raw image data. The optical correction process is, for example, the process of correcting the influence of a reduction in the amount of light in a surrounding area due to the aberration of the lens 151.

A noise suppression processing unit 305 performs the process of reducing noise in the reduced raw image data. This noise suppression process is a process generally termed noise removal or noise reduction (NR). The noise suppression processing unit 305 reduces the noise components of the reduced raw image data by executing a moving average filter process or a median filter process.

An LV development processing unit 306 executes a development process (LV development) on the reduced raw image data. The LV development process is a simplified development process in which the circuit load by the process and a communication band with the memory 134 are lower than in a raw (high image quality) development process. The developed reduced raw image data is referred to as "display image data".

An LV correction processing unit 307 executes correction processes such as distortion correction, an enlargement process, and a reduction process on the display image data. Based on the resolution of a display device on which a live view image is to be displayed, the LV correction processing unit 307 executes the enlargement process or the reduction process.

An LV effect processing unit 308 executes on the display image data an effect process for obtaining a predetermined display effect. The effect process is, for example, the process of performing color conversion on the display image data into a sepia tone or monochrome, or processing the image into a mosaic or a painting-like image.

The display processing unit 309 executes a display process for displaying an image on the display unit 101 and the EVF 108 using the display image data. The display processing unit 309 performs input/output correction, gamma correction, and white balance correction on the display image data. The display processing unit 309 also performs the process of combining the display image data with assist information to be displayed with the image based on the display image data. The assist information includes at least any of menu icons, icons indicating imaging parameters, and icons indicating imaging conditions.

The icons indicating imaging parameters are, for example, icons indicating parameters such as the International Organization for Standardization (ISO) sensitivity, the color temperature, the shutter speed, and the aperture. The icons indicating imaging conditions include, for example, an icon indicating the number of captured images in a single-image capturing mode, a continuous image capturing mode, or an interval image capturing mode, an icon indicating whether the flash can be used, and an icon indicating a set image capturing mode. The assist information may be superimposed on the peripheral area of the image based on the display image data, or may be processed to be displayed in an icon display area provided along the outer periphery of the image based on display image data. The display processing unit 309 outputs the display image data subjected to the above process to the display unit 101 or the EVF 108.

Based on the input display image data, the image is displayed on the display unit 101 and the EVF 108. By the above series of processes, the live view image is displayed on the display unit 101 and the EVF 108.

The detection processing unit 310 executes, on the reduced raw image data, the process of detecting parameters for image capturing control. The detection processing unit 310 calculates the evaluation values of the focus state and the exposure state from the reduced raw image data. The calculated evaluation values are stored in the memory 134, and based on evaluation values read from the memory 134 by the system control unit 132, the detection processing unit 310 outputs a control signal to the lens unit 150. The detection processing unit 310 has the function of detecting and recognizing object information such as a face or a person in image information. For example, the detection processing unit 310 detects a face in a screen represented by the image information, and if there is a face in the screen, stores information indicating the position of the face in the memory 134. The system control unit 132 authenticates a particular person based on feature information regarding the face stored in the memory 134. Display information indicating the calculated evaluation values and the detection and recognition results may be output to the display processing unit 309 and displayed with the live view image.

Next, a description is given of the processing of the image processing unit 131 in the image processing path used for the image capturing/recording process.

The raw noise suppression processing unit 311 performs the process of reducing noise in the raw image data processed by the sensor correction processing unit 302. Similar to the noise suppression processing unit 305, the raw noise suppression processing unit 311 executes a process generally termed noise removal or noise reduction (NR). The raw noise suppression processing unit 311 reduces the noise components in the raw image data by, for example, executing a moving average filter process or a median filter process.

A compression processing unit 312 applies a compression process to the raw image data processed by the raw noise suppression processing unit 311. The various conventional compression processing techniques can be used as the compression process applied to the raw image data. The compression processing unit 312 performs high-efficiency coding on the raw image data using a technique such as wavelet transform, quantization, or entropy encoding (difference encoding). The high-efficiency coding performed by the compression processing unit 312 may be irreversible coding or reversible coding. In the present exemplary embodiment, the high-efficiency coding performed by the compression processing unit 312 is coding for generating a raw file that can be restored as a high image quality file without greatly impairing the quality of raw image data of the original image even if the raw file is compressed. The compressed raw image data may be temporarily stored and buffered in the memory 134.

A transmission processing unit 313 transmits the compressed raw image data to a reception processing unit 321 of the main engine 140. Since the compressed raw image data can be temporarily buffered using the image processing unit 131 and the memory 134 of the front engine 130, the input speed to the main engine 140, which performs a high image quality development process at the subsequent stage, can be adjusted. Thus, according to the processing speed of the main engine 140, the transmission rate (the transmission speed) between the transmission processing unit 313 and the reception processing unit 321 can be made lower than the rate of reading image data from the sensor unit 106.

The main engine 140 executes a high image quality development process on the raw image data acquired from the front engine 130 and stores recording image data in the recording medium 200. The image processing unit 141 of the main engine 140 processes the raw image data acquired from the front engine 130, thereby generating recording image data. The recording/reproducing unit 143 stores the recording image data in the recording medium 200.

The image processing unit 141 is an image processing circuit including one or more processors and circuits that process input image data. As illustrated in FIG. 3, the image processing unit 141 includes a plurality of functional blocks (processes). Each functional block (process) may be implemented by an individual program or electronic circuit, or the plurality of functional blocks may be implemented by a single program or electronic circuit. In the transmission and reception of data between the functional blocks of the image processing unit 141, the data may be directly transmitted between the functional blocks, or a preprocessing functional block may store the data in the memory 145, and a post-processing functional block may read the data from the memory 145.

The reception processing unit 321 receives the compressed raw image data transmitted from the transmission processing unit 313 and performs inverse transformation of the compression process applied by the compression processing unit 312, on the compressed raw image data, thereby decompressing the compressed state.

A raw development processing unit 322 executes a development process on the raw image data, thereby generating recording image data. The raw development processing unit 322 performs a debayer process (demosaic process), i.e., a color interpolation process, on the raw image data, thereby converting the raw image data into a luminance signal and a color difference signal or an original color signal. Further, the raw development processing unit 322 removes noise included in the converted signals and corrects optical distortion included in the converted signals. In the development process executed by the raw development processing unit 322, processing with higher accuracy than that in the development process executed by the LV development processing unit 306 is performed. Thus, more resources for the circuits and higher power consumption than those in the LV development process are required.

A correction processing unit 323 executes correction processes such as distortion correction, an enlargement process, a reduction process, and a noise suppression process on the image data subjected to the development process. In a case where the image capturing/recording process is executed, the correction processing unit 323 executes the distortion correction and the noise suppression process on the recording image data subjected to the development process. In a case where a live view output process for outputting the image data as a live view image to the external apparatus via the communication unit 109 is executed, the correction processing unit 323 executes the enlargement process or the reduction process for outputting the image data to a display device, in addition to the distortion correction and the noise suppression process.

In a case where the live view output process is executed, an effect processing unit 324 executes on the image data an effect process for obtaining a predetermined display effect. If the external output function is enabled, the image data processed by the effect processing unit 324 is output to an output processing unit 327.

The output processing unit 327 outputs the image data output from the effect processing unit 324 to the external apparatus via the communication unit 109. In a case where the live view output process is executed, the output processing unit 327 performs input/output correction, gamma correction, and white balance correction on the image data (LV image data) output from the effect processing unit 324. The output processing unit 327 also performs the process of combining, with the LV image data, a graphical user interface (GUI) representing assist information to be displayed with an image based on the LV image data. The assist information is similar to the information described in the display processing unit 309, and therefore is not described. The output processing unit 327 outputs the processed LV image data to the external apparatus via the communication unit 109.

In a case where a reproduction output process is executed, the output processing unit 327 performs input/output correction, gamma correction, and white balance correction on the image data (reproduction image data) output from the effect processing unit 324. Further, the output processing unit 327 performs the process of combining, with the reproduction image data, a GUI representing assist information to be displayed in the reproduction mode. The output processing unit 327 outputs the processed reproduction image data to the external apparatus via the communication unit 109.

A compression processing unit 325 applies a compression process to the recording image data. The compression processing unit 325 applies high-efficiency coding (compression coding) to the recording image data, generates image data having a compressed amount of data, and converts the image data into a high image quality developed file. If the recording image data is a still image, a Joint Photographic Experts Group (JPEG) compression process is used as the compression process. If the recording image data is a moving image, a standard coding technique based on Moving Picture Experts Group (MPEG) –2, H.264, or H.265 can be used to compress the moving image.

A recording processing unit 326 of the recording/reproducing unit 143 stores the compressed recording image data in the recording medium 200.

By the above-described processing, a series of processes in the image capturing/recording process is executed. In other words, image processing regarding the display process for displaying an LV image completes using only the front engine 130. On the other hand, the image capturing/recording process is performed using both the front engine 130 and the main engine 140.

Figure 4:
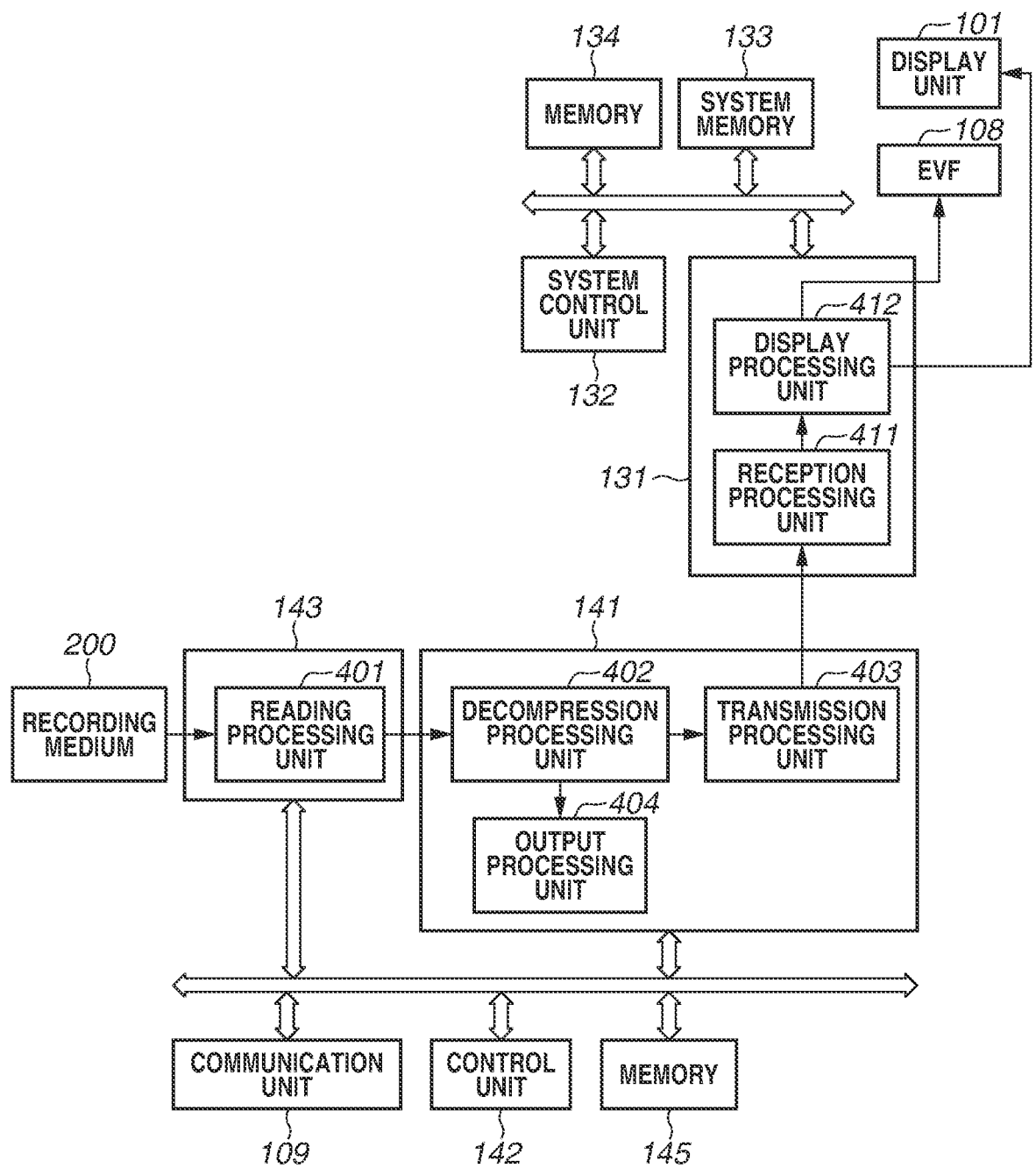
FIG. 4 is a block diagram illustrating a data flow in a reproduction mode.

FIG. 4 is a block diagram illustrating a data flow in the reproduction mode in the image processing unit 131 and the system control unit 132 of the front engine 130.

If the digital camera 100 is operating in the reproduction mode, both the front engine 130 and the main engine 140 operate in a normal state. The normal state is the state where each engine can execute image processing. In contrast to the normal state, the state where power is limited (limited state) is an operation state where the power consumption is at least lower than in the normal state, and for example, is the state where a part or all of the image processing that can be executed in the normal state cannot be executed. Even in the limited state, each engine can receive an instruction regarding the start of the engine from outside and execute start control. Thus, the limited state can also be said to be a standby state.

For example, in the normal state, the front engine 130 can execute a display control process for displaying an image on the display unit 101 or the EVF 108 based on raw image data input from the sensor unit 106. In the normal state, the front engine 130 can also execute the process of compressing raw image data input from the sensor unit 106 and the process of outputting the raw image data to the main engine 140. The front engine 130 includes the system control unit 132 that controls the operation of the digital camera 100. Thus, in a case where the power supply of the digital camera 100 is on, the front engine 130 basically does not transition to the limited state unless the front engine 130 transitions to a sleep mode because an operation is not performed for a predetermined time or more.

In the normal state, the main engine 140 can execute a recording control process for processing compressed raw image data input from the front engine 130 and storing the raw image data in the recording medium 200. In the normal state, the main engine 140 can also execute a reproduction display control process for reading image data stored in the recording medium 200, outputting the image data to the front engine 130, and displaying an image on the display unit 101 or the EVF 108 using the front engine 130. Further, the main engine 140 can execute an output control process for outputting image data input from the front engine 130 to the external apparatus via the communication unit 109. On the other hand, in the limited state, the main engine 140 cannot execute at least any of the recording control process, the reproduction display control process, and the output control process.

First, a reading processing unit 401 of the recording/reproducing unit 143 reads an image file from the recording medium 200. The image file is an image file subjected to compression coding in advance similarly to a recording process. The read image file is output to the image processing unit 141 of the main engine 140.

A decompression processing unit 402 executes a decompression process for applying inverse transformation to the compression process to the image file, thereby generating image data. A transmission processing unit 403 transmits the image data to the front engine 130.

An output processing unit 404 processes the image data output from the decompression processing unit 402 to generate display image data. Then, the output processing unit 404 outputs the display image data to the external apparatus via the communication unit 109. The output processing unit 404 performs input/output correction, gamma correction, and white balance correction on the image data output from the decompression processing unit 402. The output processing unit 404 also performs the process of combining, with the image data, a GUI representing assist information to be displayed with an image based on the image data. The output processing unit 404 can also generate thumbnail images for thumbnail display. The output processing unit 404 outputs the processed image data to the external apparatus via the communication unit 109. A reception processing unit 411 of the front engine 130 receives the image data output from the main engine 140.

A display processing unit 412 processes the received image data to generate display image data. Then, the display processing unit 412 displays an image on the display unit 101 or the EVF 108 based on the display image data.

If the user gives an instruction to perform thumbnail display by operating the operation unit 110, the system control unit 132 controls the main engine 140 to read a plurality of pieces of image data to be used for thumbnail display from the recording medium 200 and output the plurality of pieces of image data to the front engine 130. Then, the system control unit 132 controls the display processing unit 412 to generate thumbnail images and a list display screen based on the acquired plurality of pieces of image data.

Next, control of the entire digital camera 100 is described.

Figure 5A:
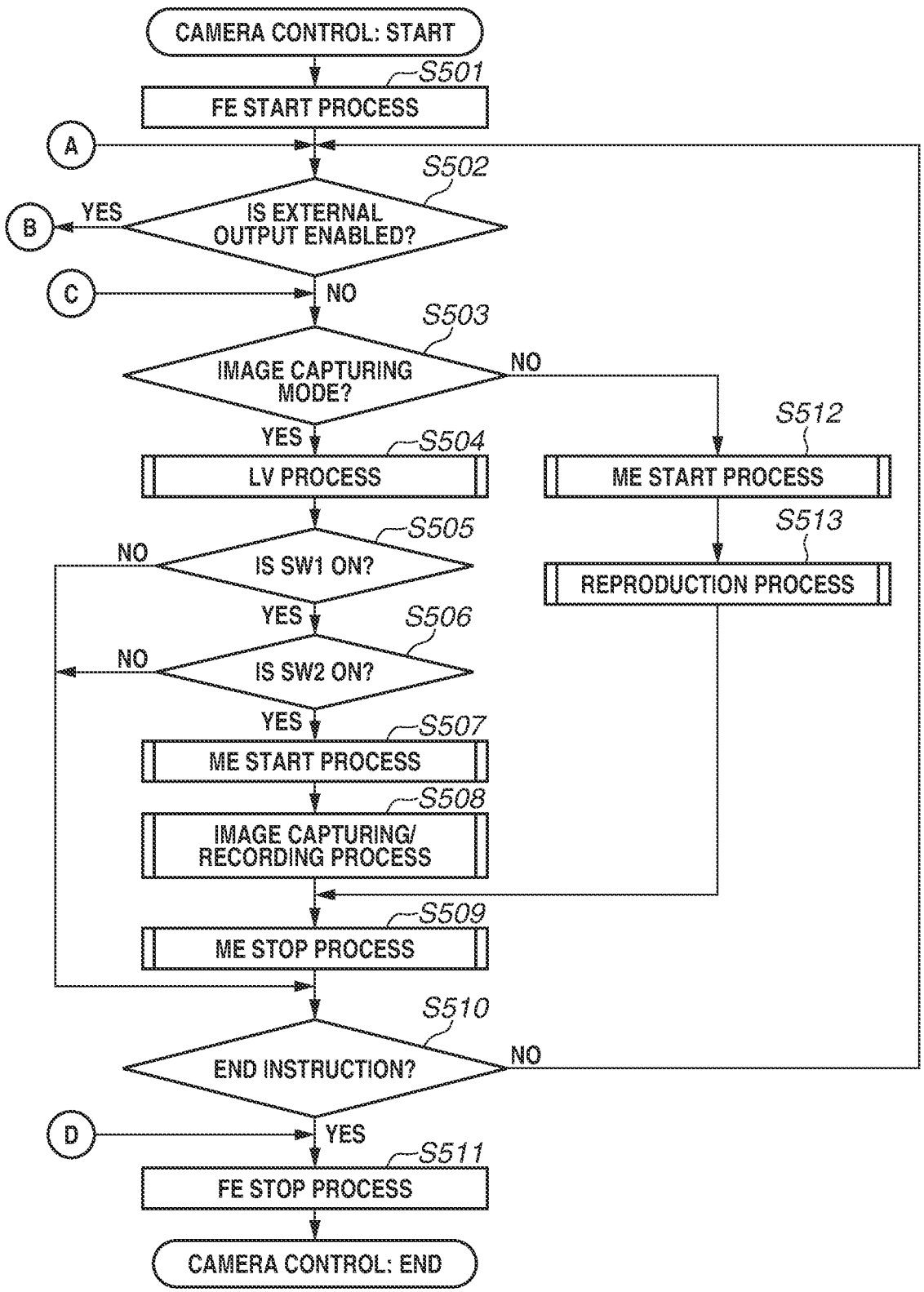
FIGS. 5A and 5B are flowcharts illustrating an operation control flow of the digital camera.
Figure 5B:
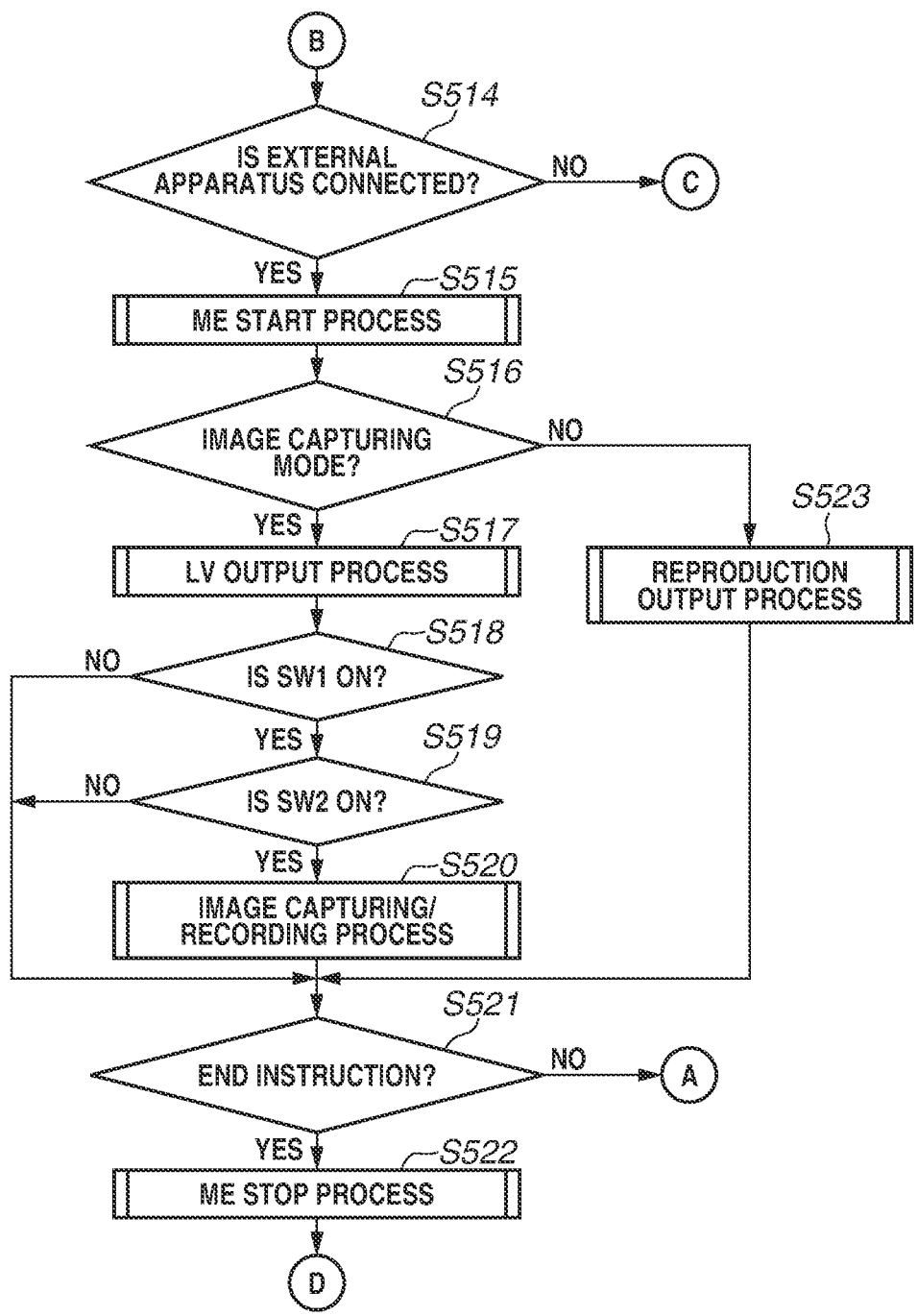

FIGS. 5A and 5B are flowcharts illustrating an operation control flow of the digital camera 100. These flowcharts start when the power switch 103 of the digital camera 100 is operated from off to on. In FIGS. 5A and 5B, reference signs A to D are symbols for connecting reference signs written in the respective figures. For example, if the determination is Yes in step S502 in FIG. 5A, the processing proceeds to step S514 in FIG. 5B via reference sign B.

In step S501, a start process for starting the front engine 130 is executed. In response to the reception of a start instruction from the power switch 103, the power supply control unit 107 supplies power to the front engine 130. The system control unit 132 of the front engine 130 reads a start-up program and a parameter from the system memory 133 and executes a start operation. Meanwhile, the power supply control unit 107 restricts the supply of power to the main engine 140. More specifically, the power supply control unit 107 does not supply power required for the main engine 140 to operate in the normal state.

Figure 6:
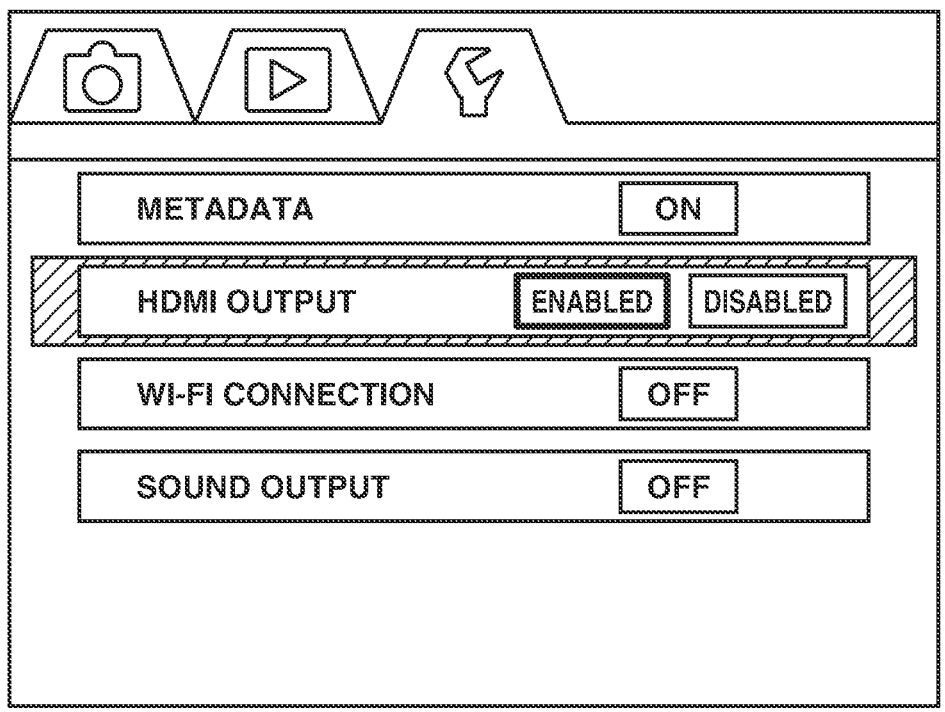
FIG. 6 is a schematic diagram illustrating an example of a menu screen for setting an external output function.

In step S502, the system control unit 132 determines whether the external output function of the digital camera 100 is set to "enabled". The system control unit 132 reads setting data stored in the system memory 133 and determines whether the external output function is set to "enabled". The external output function is the function of outputting a live view image to the external apparatus via the communication unit 109. The settings about the external output function is set in advance by operating the menu screen. At the time of shipment, the external output function is off. FIG. 6 is a schematic diagram illustrating an example of a screen for setting the external output (HDMI output) function in the menu screen. The menu screen is displayed on the display unit 101, and the user operates the operation unit 110 (e.g., cross key 114 and SET button 115) to set the external output function to either "enabled" or "disabled". If the external output function is enabled (Yes in step S502), the processing proceeds to step S514. If the external output function is disabled (No in step S502), the processing proceeds to step S503.

In step S503, the system control unit 132 determines whether the operation mode of the digital camera 100 is the image capturing mode or the reproduction mode. The system control unit 132 reads setting data stored in the system memory 133 and confirms the operation mode of the digital camera 100. Alternatively, based on an operation mode indicated by the mode switch 121, the system control unit 132 confirms the operation mode of the digital camera 100. If the operation mode of the digital camera 100 is set to the image capturing mode (Yes in step S503), the processing proceeds to step S504. If the operation mode of the digital camera 100 is set to the reproduction mode (No in step S503), the processing proceeds to step S512. In step S512, a start process for starting the main engine 140 is performed, and in step S513, a reproduction process for reproducing an image is performed. This flowchart is described regarding a case where the image capturing mode is the still image capturing mode. Alternatively, the image capturing mode may be the moving image capturing mode.

Further, in step S503, the system control unit 132 determines whether the main engine 140 is in the normal state. If the main engine 140 is in the normal state, the system control unit 132 executes a stop process for stopping the main engine 140. This is control for, if the external output function is changed from "enabled" to "disabled" as described below, changing the state of the main engine 140 to the limited state. Details of this process will be described below.

In step S504, the system control unit 132 executes a live view process. The live view process is the process of displaying on the display unit 101 a live view image acquired from the sensor unit 106. If the live view process is executed, an image (live view image) based on image data input from the sensor unit 106 is displayed on the display unit 101 or the EVF 108. The user confirms the displayed live view image and determines the imaging conditions of an image to be captured (recorded). In other words, it can be said that while the live view process is executed, and until an instruction regarding the execution of the capturing of an image, such as the first shutter switch signal SW1 or the second shutter switch signal SW2, is input, the digital camera 100 is in the image capturing standby state.

Figure 7:
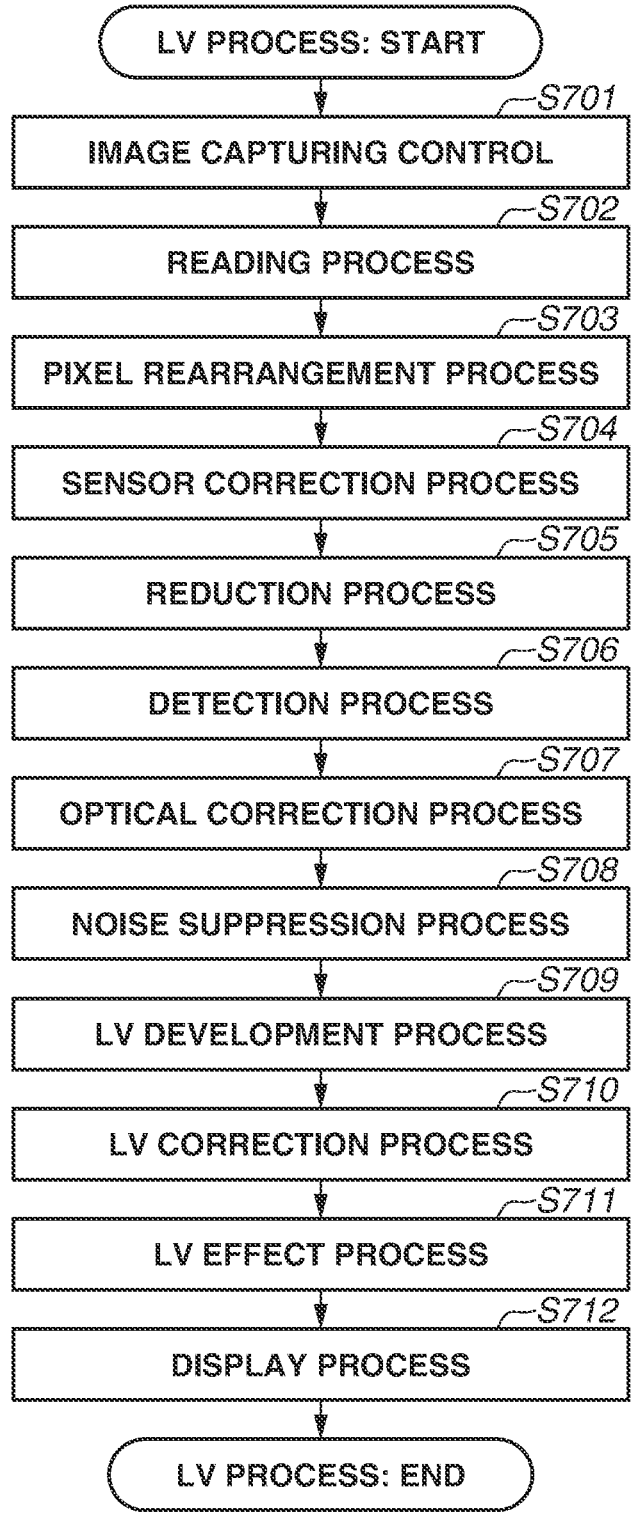
FIG. 7 is a flowchart illustrating a flow of a live view process.

FIG. 7 is a flowchart illustrating a flow of the live view process.

In step S701, the system control unit 132 controls the operations of the lens 151 and the sensor unit 106 to acquire (capture) an optical image, and outputs image data. For example, in response to an instruction regarding the zoom or the focus from the user, the system control unit 132 outputs an instruction to the lens system control circuit 154 via the communication terminal 104 to control the focus position of the lens 151. The system control unit 132 controls the shutter 105 and the sensor unit 106 to form an optical image on the imaging sensor of the sensor unit 106. Based on information regarding evaluation values and object information obtained by a detection process, the system control unit 132 controls the adjustment of the focus to a particular object or the tracking of the particular object.

In step S702, the image processing unit 131 executes a reading process for reading, from the sensor unit 106, electric signals for generating image data. At this time, the reading speed is 1000 megapixels (MP)/second.

In step S703, the pixel rearrangement processing unit 301 rearranges the input electric signals in a two-dimensional matrix, and generates raw image data.

In step S704, the sensor correction processing unit 302 executes on the raw image data a correction process based on the characteristics of the sensor acquired in advance.

In step S705, the reduction processing unit 303 applies a reduction process to the raw image data to generate reduced raw image data.

In step S706, the detection processing unit 310 executes on the reduced raw image data the process of detecting parameters for image capturing control. The process of step S706 may be executed in parallel with another process in the LV process.

In step S707, the optical correction processing unit 304 executes a correction process (optical correction process) related to the optical characteristics of the lens 151 on the reduced raw image data.

In step S708, the noise suppression processing unit 305 executes the process of reducing noise, on the reduced raw image data to which the optical correction process is applied.

In step S709, the LV development processing unit 306 applies a development process (LV development process) to the reduced raw image data subjected to the noise suppression process, and generates display image data.

In step S710, the LV correction processing unit 307 executes correction processes such as distortion correction, an enlargement process, and a reduction process on the display image data.

In step S711, the LV effect processing unit 308 executes on the display image data an effect process for obtaining a predetermined display effect.

In step S712, the display processing unit 309 executes a display process for displaying an image on the display unit 101 and the EVF 108 using the display image data.

In this way, the flow of the LV process is completed.

The description returns to the flowcharts in FIGS. 5A and 5B. The processing proceeds to step S505.

In step S505, the system control unit 132 determines whether the first shutter switch signal SW1 is input. More specifically, the system control unit 132 determines whether the user executes a half press operation on the shutter button 102. In other words, the system control unit 132 determines whether the user inputs an execution instruction to execute an image capturing preparation operation. If the first shutter switch signal SW1 is input (Yes in step S505), the processing proceeds to step S506. If the first shutter switch signal SW1 is not input (No in step S505), the processing proceeds to step S510.

In step S506, the system control unit 132 determines whether the second shutter switch signal SW2 is input. More specifically, the system control unit 132 determines whether the user executes a full press operation on the shutter button 102. In other words, the system control unit 132 determines whether the user inputs an execution instruction to execute an image capturing operation. If the second shutter switch signal SW2 is input (Yes in step S506), the processing proceeds to step S507. If the second shutter switch signal SW2 is not input (No in step S506), the processing proceeds to step S510.

In step S507, the start process for starting the main engine 140 is executed. The system control unit 132 controls and instructs the power supply control unit 107 to start the supply of power to the main engine 140. More specifically, the power supply control unit 107 lifts the limitation of power supplied to the main engine 140. The system control unit 132 controls the control unit 142 of the main engine 140 to execute the start operation of the main engine 140. Details of the start operation will be described below.

Figure 8:
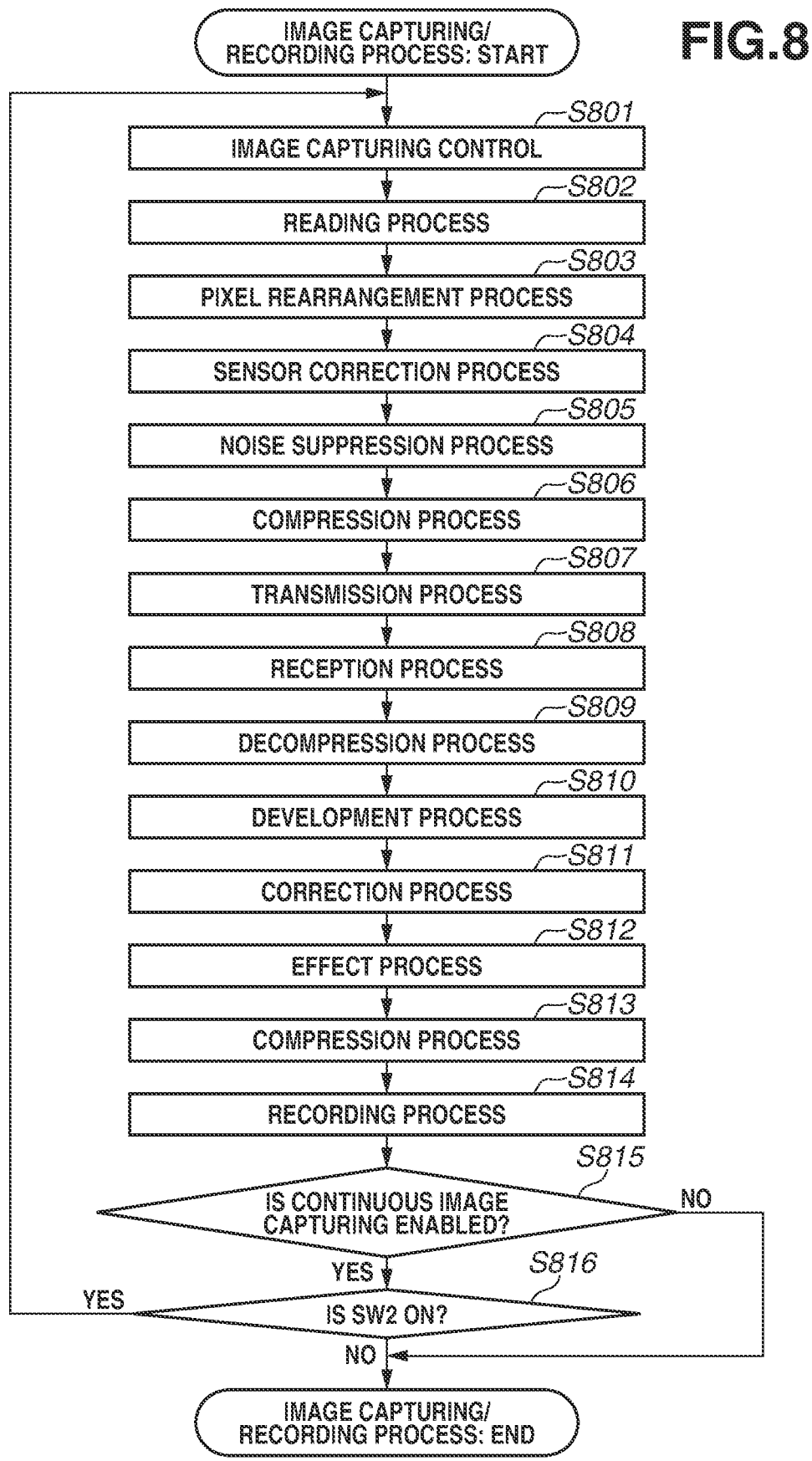
FIG. 8 is a flowchart illustrating a flow of an image capturing/recording process.

In step S508, an image capturing/recording process is executed. The image capturing/recording process is a series of processes from the application of a high image quality development process to raw image data acquired (captured) by the sensor unit 106 to the recording of the raw image data in a recording medium determined in advance. FIG. 8 is a flowchart illustrating a flow of the image capturing/recording process.

In step S801, the system control unit 132 controls the operations of the lens 151 and the sensor unit 106 to acquire recording image data. Before transitioning to the image capturing/recording process, the system control unit 132 controls the adjustment of the focus to a particular object, the white balance, the ISO sensitivity, and the exposure based on information regarding evaluation values and object information acquired by the detection processing unit 310 in response to the input of the first shutter switch signal SW1.

In step S802, the image processing unit 131 executes a reading process for reading, from the sensor unit 106, electric signals for generating image data. The image processing unit 131 reads image data of a single frame in 5 ms from the sensor unit 106. At this time, the reading speed is 1500 MP/second in pixel terms.

In step S803, the pixel rearrangement processing unit 301 rearranges the input electric signals in a two-dimensional matrix, to generate raw image data.

In step S804, the sensor correction processing unit 302 executes on the raw image data a correction process (sensor correction process) based on the characteristics of the sensor acquired in advance.

In step S805, the raw noise suppression processing unit 311 applies the process of reducing noise, to the raw image data processed by the sensor correction processing unit 302.

In step S806, the compression processing unit 312 applies a compression process on the raw image data processed by the raw noise suppression processing unit 311. The compression processing unit 312 temporarily stores and buffers the compressed raw image data in the memory 134.

In step S807, the transmission processing unit 313 transmits the compressed raw image data to the reception processing unit 321 of the main engine 140. The transmission processing unit 313 transmits each frame in 15 ms to the reception processing unit 321. In this case, the speed of the front engine 130 transferring a single frame to the main engine 140 is lower than the speed of the front engine 130 reading a single frame from the sensor unit 106.

In the image processing (development process) executed by the image processing unit 141 of the main engine 140, processing with higher accuracy than that in the image processing of the front engine 130 is executed. Thus, the amount of data (number of frames) that can be processed per unit time by the main engine 140 is smaller than that by the front engine 130.

The compressed raw image data is buffered, whereby the speed of transferring image data from the front engine 130 to the main engine 140 can be made lower than the speed of reading image data from the sensor unit 106. In this way, image data can be transferred at a data rate at which the main engine 140 can process the image data. Accordingly, image processing with high accuracy can be executed without implementing a large-scale image processing circuit capable of executing the image processing with high accuracy at the reading speed of the sensor unit 106. The image processing with high accuracy is image processing with accurate color reproducibility and correction.

In step S808, the reception processing unit 321 receives the compressed raw image data transmitted from the transmission processing unit 313.

In step S809, the reception processing unit 321 performs inverse transformation to the compression process applied by the compression processing unit 312, on the compressed raw image data, to decompress the compressed state.

In step S810, the raw development processing unit 322 executes a development process on the raw image data, to generate recording image data.

In step S811, the correction processing unit 323 applies distortion correction and a noise suppression process to the recording image data.

In step S812, the effect processing unit 324 executes an effect process on the recording image data. The effect process is the process of applying an effect determined in advance to the recording image data. The effect process is, for example, a monochrome conversion process or the process of applying various filters.

In step S813, the compression processing unit 325 applies a compression process to the recording image data.

In step S814, the recording processing unit 326 of the recording/reproducing unit 143 stores the compressed recording image data in the recording medium 200.

In step S815, the system control unit 132 determines whether a continuous image capturing function is enabled. The continuous image capturing function can be set by the user operating the menu screen. If the continuous image capturing function is enabled (Yes in step S815), the processing proceeds to step S816. If the continuous image capturing function is disabled (No in step S815), the image capturing/recording process ends.

In step S816, the system control unit 132 determines whether the second shutter switch signal SW2 is input. In other words, the system control unit 132 determines whether the state where the user strongly pushes in the shutter button 102 continues. If the second shutter switch signal SW2 is input in step S816 (Yes in step S816), the processing returns to step S801. In step S801, the image capturing/recording process is executed again. If the second shutter switch signal SW2 is not input in step S816 (No in step S816), the image capturing/recording process ends.

In the above flowchart, the main engine 140 records in the recording medium 200 the image data obtained by applying the decompression process and the development process to the compressed raw image data output from the front engine 130. The main engine 140 can also record in the recording medium 200 the compressed raw image data output from the front engine 130. In this case, the series of processes from steps S809 to S813 is not executed. The recording/reproducing unit 143 records in the recording medium 200 the compressed raw image data received by the reception processing unit 321.

The description returns to the flowcharts in FIGS. 5A and 5B. Upon ending the image capturing/recording process, the processing proceeds to step S509.

In step S509, the system control unit 132 executes the stop process for stopping the main engine 140. The system control unit 132 controls the control unit 142 of the main engine 140 to execute the stop operation of the main engine 140. Then, the system control unit 132 controls and instructs the power supply control unit 107 to stop the supply of power to the main engine 140. Details of the stop operation will be described below.

In step S510, the system control unit 132 determines whether an end instruction to end the operation of the digital camera 100 is input. More specifically, the system control unit 132 determines whether the power switch 103 is operated from on to off. If an operation is not performed for a predetermined time, it may be determined that the end instruction is input (so-called sleep operation). If the end instruction is input (Yes in step S510), the processing proceeds to step S511. If the end instruction is not input (No in step S510), the processing returns to step S502.

In step S511, the system control unit 132 executes a stop process for stopping the front engine 130 including the system control unit 132. The system control unit 132 also executes a stop process on other components of the digital camera 100. Consequently, the operation of the entire digital camera 100 stops, and the camera control ends.

If it is determined in step S503 that the operation mode is not the image capturing mode (operation mode is reproduction mode) (No in step S503), the processing proceeds to step S512.

In step S512, the start process for starting the main engine 140 is executed. The start process for starting the main engine 140 is a process similar to that of step S507, and therefore is not described in detail.

Figure 9:
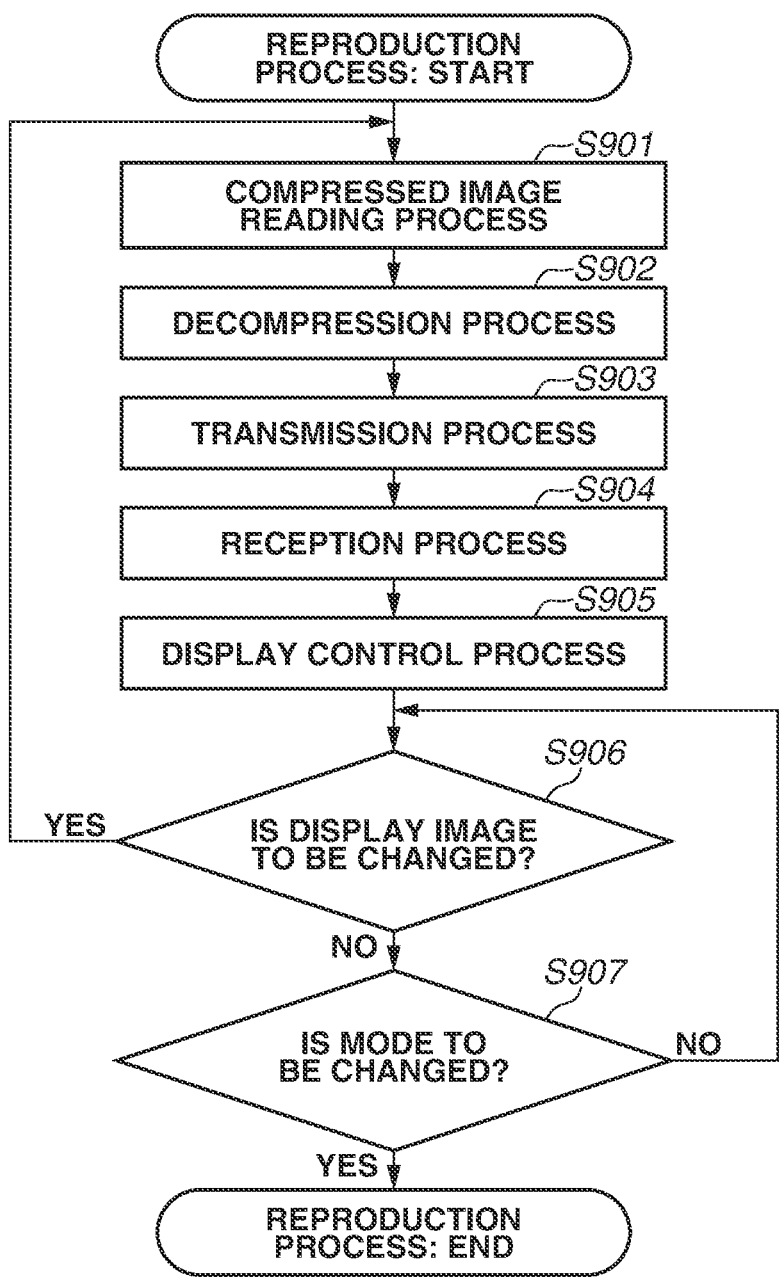
FIG. 9 is a flowchart illustrating a flow of a reproduction process.

In step S513, the reproduction process is executed. The reproduction process is the process of reading image data stored in the recording medium 200 and displaying the image data on the display unit 101. FIG. 9 is a flowchart illustrating a flow of the reproduction process.

In step S901, the recording/reproducing unit 143 reads image data from the recording medium 200. In the recording medium 200, image data compressed in a format such as JPEG is stored. The image data to be read by the recording/reproducing unit 143 is determined by the system control unit 132. The recording/reproducing unit 143 transmits the read compressed image data to the image processing unit 141.

In step S902, the image processing unit 141 executes the process of decompressing the acquired compressed image data. The decompression process is inverse transformation to the compression process applied to the image data.

In step S903, the image processing unit 141 transmits the decompressed image data to the image processing unit 131 of the front engine 130.

In step S904, the image processing unit 131 receives the image data transmitted from the main engine 140.

In step S905, the image processing unit 131 executes display control for displaying an image on the display unit 101 or the EVF 108 based on the received image data.

In step S906, the system control unit 132 determines whether a change instruction to change the display image is input through the operation unit 110. For example, the change of the display image is image advancement in response to an operation on the cross key 114, or is a change to thumbnail display in response to an operation on the enlargement button 118. If the change instruction to change the display image is input (Yes in step S906), the processing returns to step S901. The system control unit 132 transmits to the recording/reproducing unit 143 of the main engine 140 an instruction to read image data corresponding to the changed display image.

If the change instruction to change the display image is not input (No in step S906), the processing proceeds to step S907. In step S907, the system control unit 132 determines whether an instruction to change the mode is input. The instruction to change the mode may be input by the user operating the mode switch 121, or may be input when the user presses the shutter button 102. If the instruction to change the mode is not input (No in step S907), the processing returns to step S906. If the instruction to change the mode is input (Yes in step S907), the reproduction process ends.

Upon ending the reproduction process, the processing proceeds to step S509 (stop process for stopping main engine 140).

The above-described processing is the camera control process in a case where the external output function of the digital camera 100 is disabled. Through the above-described processing, if the digital camera 100 is operating in the image capturing mode, and until an image capturing execution instruction is input, it is possible to limit power supplied to the main engine 140. In a case where an object is captured using the digital camera 100, the user may adjust imaging conditions (angle of view, focus position, and zoom position) while confirming a live view image. Based on the above flow, during the period when the user adjusts the imaging conditions while confirming the live view image, it is possible to reduce power consumed by the main engine 140. Accordingly, the digital camera 100 can be efficiently used so that the digital camera 100 that operates using a power supply (a battery) with a finite capacity can be driven for a long time. Such an operation is achieved by enabling the front engine 130 to perform the display process for displaying a live view image with the configuration of the present exemplary embodiment.

Next, with reference to FIG. 5B, a description is given of the camera control in a case where the external output function is enabled. The camera control in a case where the external output function is enabled is control in a case where it is determined in step S502 in FIG. 5A that the external output function is enabled.

If it is determined in step S502 that the external output function is enabled (Yes in step S502), the processing proceeds to step S514. In step S514, the system control unit 132 determines whether the external apparatus is connected to the communication unit 109. The communication unit 109 includes a detection unit that detects a connection. Based on a signal indicating a connection detection result output from the detection unit, the system control unit 132 determines whether the external apparatus is connected to the communication unit 109. The method for determining whether the external apparatus is connected to the communication unit 109 may be another method.

For example, when step S502 is executed, the main engine 140 may be temporarily started up, and the control unit 142 of the main engine 140 may determine whether the external apparatus is connected to the communication unit 109 via the communication unit 109. Then, the determination result of the control unit 142 of the main engine 140 may be output to the system control unit 132 or a temporary memory (not illustrated), and based on the determination result, the system control unit 132 may execute a determination process. In this case, upon completing the connection detection process, the main engine 140 transitions to the limited state. The main engine 140 is temporarily started up to detect the external apparatus, thereby eliminating the need for the system control unit 132 to execute the determination process for determining whether the external apparatus is connected, and communication control for communicating with the external apparatus. Therefore, it is possible to reduce the system of the front engine 130. In step S514, the system control unit 132 may determine not only merely whether the external apparatus is connected to the communication unit 109, but also whether the communication unit 109 can communicate with the external apparatus connected to the communication unit 109 according to a predetermined communication protocol.

If it is determined in step S514 that the external apparatus is connected to the communication unit 109 (Yes in step S514), the processing proceeds to step S515. If it is determined in step S514 that the external apparatus is not connected to the communication unit 109 (No in step S514), the processing proceeds to step S503.

In step S515, the system control unit 132 executes the start process for starting the main engine 140. The process of step S515 is similar to the processes of steps S507 and S512, and therefore is not described.

In step S516, the system control unit 132 determines whether the operation mode of the digital camera 100 is the image capturing mode or the reproduction mode. The process of step S516 is similar to that of step S503, and therefore is not described. If it is determined in step S516 that the operation mode of the digital camera 100 is the image capturing mode (Yes in step S516), the processing proceeds to step S517. If it is determined in step S516 that the operation mode of the digital camera 100 is not the image capturing mode (is the reproduction mode) (No in step S516), the processing proceeds to step S523.

In step S517, the system control unit 132 executes a live view output process. The live view output process is the process of outputting a live view image acquired from the sensor unit 106 to the external apparatus connected to the digital camera 100 via the communication unit 109.

Figure 10:
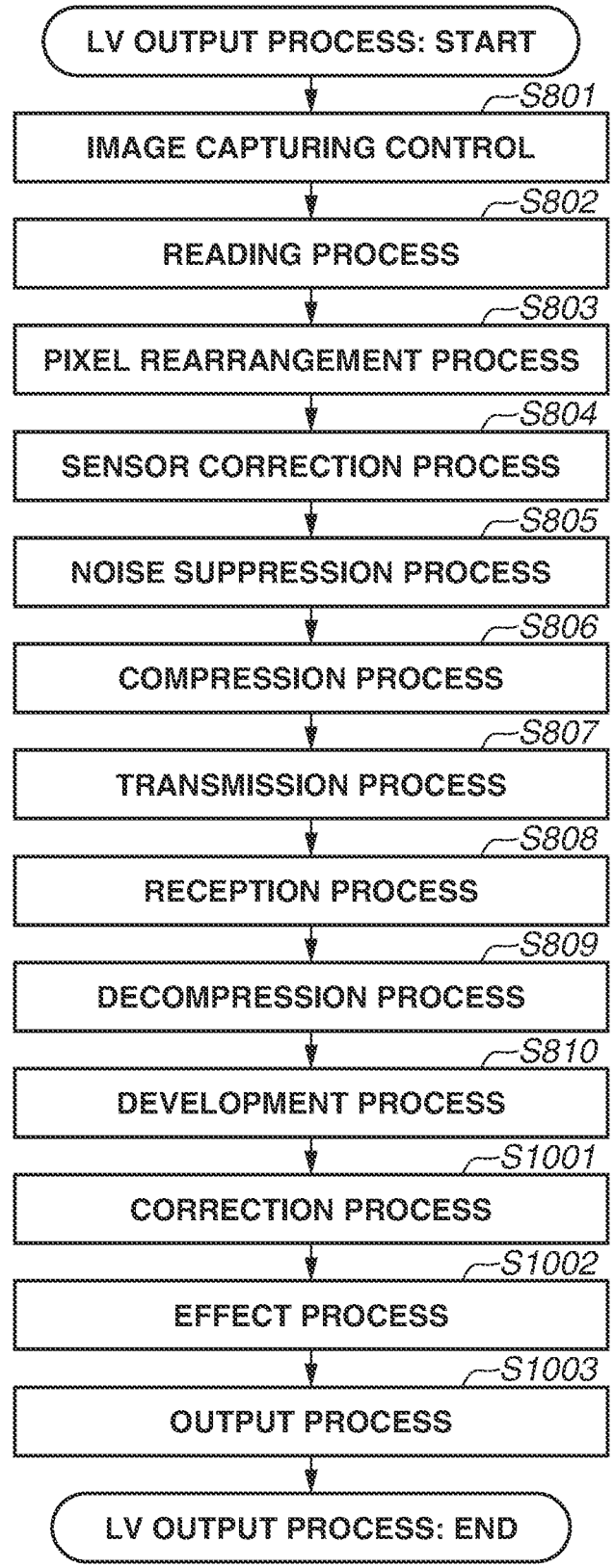
FIG. 10 is a flowchart illustrating a flow of a live view output process.

FIG. 10 is a flowchart illustrating a flow of the live view output process. In the live view output process, the main engine 140 performs a high image quality development process on image data subjected to a simplified correction process by the front engine 130. A correction process and an effect process are performed on the image data subjected to the high image quality development process by the main engine 140, and the image data is output to the external apparatus via the communication unit 109.

In the flowchart of the live view output process illustrated in FIG. 10, the processes of steps S801 to S810 are similar to the processes with the same step numbers illustrated in FIG. 8, and therefore are not described.

In step S1001, the correction processing unit 323 applies distortion correction, a noise suppression process, and an enlargement/reduction process to the image data subjected to the high image quality development process by the raw development processing unit 322.

In step S1002, the effect processing unit 324 applies an effect process determined in advance to the image data corrected by the correction processing unit 323 to confirm a live view image.

In step S1003, the output processing unit 327 applies to the image data the process of generating display image data. Then, the output processing unit 327 outputs the image data to the external apparatus via the communication unit 109. The above-described processing is the live view output process.

The description returns to the flowcharts in FIGS. 5A and 5B.

In step S518, the system control unit 132 determines whether the first shutter switch signal SW1 is input. The process of step S518 is similar to the process of step S505, and therefore is not described in detail. If the first shutter switch signal SW1 is input (Yes in step S518), the processing proceeds to step S519. If the first shutter switch signal SW1 is not input (No in step S518), the processing proceeds to step S521.

In step S519, the system control unit 132 determines whether the second shutter switch signal SW2 is input. The process of step S519 is similar to the process of step S506, and therefore is not described in detail. If the second shutter switch signal SW2 is input (Yes in step S519), the processing proceeds to step S520. If the second shutter switch signal SW2 is not input (No in step S519), the processing proceeds to step S521.

In step S520, the image capturing/recording process is executed. The image capturing/recording process is similar to the process of step S508, and therefore is not described.

In step S521, the system control unit 132 determines whether an end instruction to end the operation of the digital camera 100 is input. The process of step S521 is similar to the process of step S510, and therefore is not described in detail. If the end instruction is input (Yes in step S521), the processing proceeds to step S522.

In step S522, the system control unit 132 executes the stop process for stopping the main engine 140. The process of step S522 is similar to that of step S509, and therefore is not described in detail. The processing proceeds to step S511, and after the stop process for stopping the front engine 130, the camera control ends.

If the end instruction is not input in step S521 (No in step S521), the processing returns to step S502. In step S502, it is determined again whether the external output function is enabled. Then, the processing branches to the flow starting from step S503 or the flow starting from step S514.

If it is determined in step S516 that the operation mode is not the image capturing mode (is the reproduction mode) (No in step S516), the processing proceeds to step S523. In step S523, the system control unit 132 executes a reproduction output process. The reproduction output process is the process of outputting an image based on image data stored in the recording medium 200 to the external apparatus via the communication unit 109.

Figure 11:
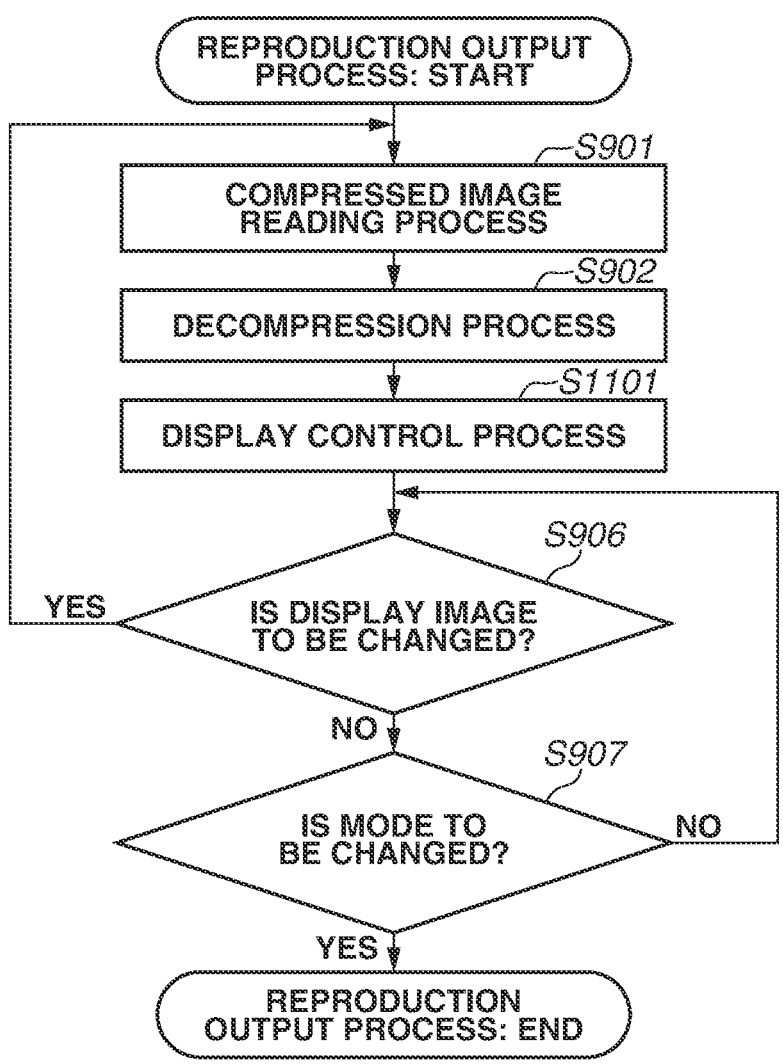
FIG. 11 is a flowchart illustrating a flow of a reproduction output process.

FIG. 11 is a flowchart illustrating a flow of the reproduction output process. In the flowchart of the reproduction output process illustrated in FIG. 11, the processes of steps S901, S902, S906, and S907 are similar to the processes with the same step numbers illustrated in FIG. 9, and therefore are not described.

In step S1101, the output processing unit 404 executes, on the image data processed by the decompression processing unit 402, a display control process for generating display image data, outputting the display image data to the external apparatus, and displaying an image. Then, the output processing unit 404 outputs the image data to the external apparatus via the communication unit 109. The above-described processing is the reproduction output process.

The above-described control is a series of processes in the control in a case where the external output function is enabled. By the above-described control, if the external output function is enabled, it is possible to output to the external apparatus an image to which the high image quality development process is applied by the main engine 140. If the external output function is disabled, it is possible to reduce the power consumption of the main engine 140.

If the external output function is enabled, and in the middle of the execution of the flow from step S514, the external output function may be set to "disabled" by a user operation. In this case, when the processing returns from step S520 to step S502, it is determined in step S502 that the external output function is disabled, and the processing proceeds to step S503. In such a case, at the time when the processing returns from step S520 to step S502, the main engine 140 operates in the normal state. Thus, even though the processes of step S503 and subsequent steps are executed, the power consumption of the main engine 140 remains high during the display of a live view image.

Further, if the external output function is enabled, and in the middle of the execution of the flow from step S514, the connection to the external apparatus may be terminated. This corresponds to, for example, a case where the cable connected to the communication unit 109 is removed. In this case, if the processing proceeds from step S514 to step S503, and the determination process in step S503 is executed, the main engine 140 continues to operate in the normal state. In this case, similarly, even though the processes of step S503 and the subsequent steps are executed, the main engine 140 continues to operate in the normal state during the display of a live view image, and the power consumption increases.

When the determination process in step S503 is executed, the main engine 140 may be operating in the normal state. As will be described below, if the external output function is enabled, the main engine 140 executes an output process for outputting image data to the external apparatus. Thus, the main engine 140 is controlled to be in the normal state. In a case where the external output function shifts from "enabled" to "disabled", or in a case where the connection to the external apparatus is terminated even if the external output function is enabled, the processing proceeds to step S503 with the main engine 140 remaining in the normal state. Thus, the system control unit 132 determines whether the main engine 140 is operating in the normal state in step S503. If the main engine 140 is operating in the normal state, the system control unit 132 executes the stop process for stopping the main engine 140. In this way, even if the main engine 140 is operating in the normal state when the determination process in step S503 is executed, it is possible to limit power to the main engine 140. Thus, even the digital camera 100 having the external output function can appropriately control the operation state of the main engine 140 according to the presence or absence of external output.

Next, a description is given of details of the start process for starting the main engine 140 and the stop process for stopping the main engine 140. The start process for starting the main engine 140 is the processes executed in steps S507, S512, and S515 in the flowcharts illustrated in FIGS. 5A and 5B. The stop process for stopping the main engine 140 is the processes executed in steps S509 and S522 in the flowcharts illustrated in FIGS. 5A and 5B.

FIGS. 12A and 12B are flowcharts illustrating flows of the start process for starting the main engine 140 and the stop process for stopping the main engine 140. FIG. 12A is the flowchart illustrating the flow of the start process for starting the main engine 140.

In step S1201, the system control unit 132 outputs to the power supply control unit 107 an instruction to start supply of power to the main engine 140.

In step S1202, the power supply control unit 107 starts the supply of power to the main engine 140.

In step S1203, the control unit 142 of the main engine 140 executes the process of reading from the system memory 144 a program and a parameter used by the main engine 140 to start.

In step S1204, the control unit 142 controls the start of the main engine 140.

By the above series of processes, the main engine 140 transitions from the limited state to the normal state.

FIG. 12B is the flowchart illustrating the flow of the stop process for stopping the main engine 140.

In step S1211, the system control unit 132 outputs an operation stop instruction to the control unit 142 of the main engine 140.

In step S1212, the control unit 142 stores, in the system memory 144, data (start data) such as a parameter required for the next start of the main engine 140. The storage location of the data may be the memory 145.

In step S1213, the control unit 142 executes the process of stopping the operation of the main engine 140.

In step S1214, the system control unit 132 outputs to the power supply control unit 107 an instruction to stop the supply of power to the main engine 140.

In step S1215, the power supply control unit 107 stops the supply of power to the main engine 140.

By the above-described series of processes, the main engine 140 transitions from the normal state to the limited state.

The main engine 140 transitions to the limited state, whereby it is possible to reduce the power consumption of the digital camera 100.

Through the above-described flows, the system control unit 132 performs control to restrict the supply of power to the main engine 140 in the image capturing standby state, and in response to an image capturing instruction (SW2) to record image data in a recording medium, lift the restriction of the supply of power to the main engine 140. However, a trigger for lifting the restriction of the supply of power to the main engine 140 is not limited to the image capturing instruction (SW2). For example, in response to an image capturing preparation instruction (SW1), which is a preliminary operation before an image is captured, the restriction of the supply of power to the main engine 140 may be lifted. With this operation, it is possible to complete the start of the main engine 140 before the second shutter switch signal SW2 is input. Thus, it is possible to acquire and record an image at the timing when the second shutter switch signal SW2 is input. In other words, the first shutter switch signal SW1, which is an image capturing preparation instruction, can also be said to be an instruction regarding an image capturing operation for recording image data acquired from the sensor unit 106 in a recording medium.

With the digital camera 100, according to the operation mode or the process to be executed, the operation states of the front engine 130 and the main engine 140 are controlled. Accordingly, it is possible to efficiently control the operations of a plurality of engines according to the state of the digital camera 100 and reduce the power consumption of the digital camera 100. Further, it is possible to generate and output image data having appropriate quality according to the operation mode.

According to embodiments of the present disclosure, in an imaging apparatus that uses a plurality of image processing circuits to process image data acquired from a sensor, it is possible to control the supply of power to each image processing circuit according to the operation of the imaging apparatus and achieve the efficient operation of the imaging apparatus.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image processing apparatus comprising:
a display;
an imaging circuit;
a first integrated circuit (IC) chip that receives image data from the imaging circuit;
a second IC chip that receives image data from the first IC chip; and
a power control circuit,
wherein the first IC chip applies a predetermined process to the image data from the imaging circuit and outputs the image data to which the predetermined process has been applied to the display in an image capturing standby state,
wherein the display displays an image corresponding to the image data output from the first IC chip in the image capture standby state,
wherein the first IC chip outputs the image data to the second IC chip in a case where a process for recording the image data is performed by the second IC chip, the second IC chip receives the image data from the first IC chip and performs the process for recording the image data received from the first IC chip on a recording medium,
wherein the process for recording by the second IC chip is not performed in the image capturing standby state, and
wherein the power control circuit supplies power to the first IC chip and restricts supply of power to the second IC chip in the image capturing standby state, and, upon input of an instruction regarding an image capturing operation for recording image data, lifts the restriction of the supply of power to the second IC chip.

2. The image processing apparatus according to claim 1, wherein the instruction regarding the image capturing operation includes an instruction for an image capturing preparation, and
wherein the image capturing preparation includes at least one of an auto-focus process and an auto-exposure process.

3. The image processing apparatus according to claim 1, wherein the instruction regarding the image capturing operation includes an image capturing instruction for capturing and recording an image.

4. The image processing apparatus according to claim 1, wherein the instruction regarding the image capturing operation is issued in accordance with an operation of a shutter switch by a user.

5. The image processing apparatus according to claim 4, wherein the operation of the shutter switch includes a first switch operation for an image capturing preparation including at least one of an auto-focus process and an auto-exposure process and a second switch operation, which is executed after the first switch operation, for capturing and recording an image,
wherein the power control circuit lifts the restriction of the supply of power to the second IC chip in accordance with the first switch operation.

6. The image processing apparatus according to claim 1, wherein the power control circuit restricts the supply of power to the second IC chip in accordance with completion of the recording the image data by the second IC chip.

7. The image processing apparatus according to claim 1, wherein the second IC chip reproduces image data from the recording medium and outputs the reproduced image data to the first IC chip in a reproduction mode and the first IC chip receives the image data output from the second IC chip and outputs the image data received from the second IC chip to the display in the reproduction mode, and
wherein the power control circuit does not restrict supply of power to the first IC chip and the second IC chip in the reproduction mode.

8. The image processing apparatus according to claim 1, wherein the first IC chip outputs, in the image capturing standby state, the image data obtained by applying a first development process to the image data from the imaging circuit to the display.

9. The image processing apparatus according to claim 8, wherein the first IC chip, upon input of the instruction, outputs the image data to the second IC chip without applying the first development process to the image data from the imaging circuit, and
wherein the second IC chip records, on the recording medium, image data obtained by applying a second development process to the image data received from the first IC chip.

10. The image processing apparatus according to claim 1, wherein the first IC chip applies a noise reduction process to the image data from the imaging circuit, applies a simplified development process to the image data to which the noise reduction process has been applied, and outputs the image data obtained by the simplified development process to the display, and
wherein the second IC chip applies a development process for generating image data having a higher image quality than that in the simplified development process, to the image data received from the first IC chip, and records on the recording medium the image data obtained by the development process.

11. The image processing apparatus according to claim 1, wherein upon receiving a power-on instruction of the image processing apparatus, the power control circuit supplies power with which the first IC chip can execute a start operation to the first IC ship, and supplies limited power to the second IC chip.

12. The image processing apparatus according to claim 1, further comprising:
a first memory for the first IC chip; and
a second memory for the second IC chip.

13. The image processing apparatus according to claim 1, wherein the power control circuit supplies power necessary for a normal operation of the first IC chip to the first IC chip in the image capturing standby state, and supplies power necessary for a normal operation of the second IC chip to the second IC chip in accordance with the lifting of the restriction of the supply of power to the second IC chip.

14. The image processing apparatus according to claim 1, wherein the imaging circuit continuously acquires image data in the image capture standby state and outputs the acquired image data to the first IC chip, and
wherein the display displays the image data output from the first IC chip as a live view image in the image capture standby state.

15. The image processing apparatus according to claim 1, wherein the predetermined process includes a pixel rearrangement process for rearranging the image data received from the imaging circuit and a sensor correction process which is a correction process based on a characteristic of an imaging sensor of the imaging circuit.

16. A controlling method of controlling an image processing apparatus having a display, a first integrated circuit (IC) chip that receives image data from an imaging circuit, and a second IC chip that receives image data from the first IC chip, the controlling method comprising:
applying a predetermined process to the image data from the imaging circuit by the first IC chip and outputting the image data to the display from the first IC chip in an image capturing standby state of the image processing apparatus;
displaying an image corresponding to the image data output from the first IC chip in the image capture standby state on the display;
outputting the image data from the first IC chip to the second IC chip in a case where a process for recording the image data is performed by the second IC chip;
performing the process for recording the image data received from the first IC on a recording medium by the second IC chip,
wherein the process for recording by the second IC chip is not performed in the image capturing standby state;
supplying power to the first IC chip and restricting the supply of power to the second IC chip in the image capturing standby state; and lifting the restriction of the supply of power to the second IC chip upon input of an instruction regarding an image capturing operation for recording image data.

17. An image processing apparatus comprising:
a display;
a first integrated circuit (IC) chip that receives image data from an imaging circuit;
a second IC chip that receives image data from the first IC chip; and
a power control circuit,
wherein the first IC chip has a first image processing path for displaying and a second image processing path for recording and outputs the image data to which an image processing by the first image processing path has been applied to the display in an image capturing standby state,
wherein the display displays an image corresponding to the image data output from the first IC chip in the image capturing standby state,
wherein the first IC chip outputs the image data to which an image processing by the second image processing path has been applied to the second IC chip in a case where a process for recording image data is performed by the second IC chip,
wherein the second IC chip receives the image data to which the image processing by the second image processing path has been applied from the first IC chip and performs the process for recording the image data received from the first IC chip on a recording medium,
wherein the process for recording by the second IC chip is not performed in the image capturing standby state, and
wherein the power control circuit supplies power to the first IC chip and restricts supply of power to the second IC chip in the image capturing standby state, and, upon input of an instruction regarding an image capturing operation for recording image data, lifts the restriction of the supply of power to the second IC chip.

18. The image processing apparatus according to claim 17, wherein the instruction regarding the image capturing operation includes an instruction for an image capturing preparation, and
wherein the image capturing preparation includes at least one of an auto-focus process and an auto-exposure process.

19. The image processing apparatus according to claim 17, wherein the instruction regarding the image capturing operation includes an image capturing instruction for capturing and recording an image.

20. The image processing apparatus according to claim 17, wherein the first IC chip performs a predetermined process including a pixel rearrangement process for rearranging the image data received from the imaging circuit and a sensor correction process which is a correction process based on a characteristic of an imaging sensor of the imaging circuit and outputting RAW image data,
wherein the first image processing path applies a noise reduction process to the RAW image data obtained by the predetermined process, applies a simplified development process to the RAW image data to which the noise reduction process has been applied, and outputs the image data obtained by the simplified development process to the display,
wherein the second image processing path applies a RAW noise reduction process to the RAW image data obtained by the predetermined process and outputs the RAW image data to which the RAW noise reduction process has been applied to the second IC chip, and
wherein the second IC chip applies a development process for generating image data having a higher image quality than that in the simplified development process, to the RAW image data received from the first IC chip, and records on the recording medium the image data obtained by the development process.

* * * * *